US008206772B2

(12) United States Patent  
Klemann et al.

(10) Patent No.: US 8,206,772 B2
(45) Date of Patent: Jun. 26, 2012

(54) STRUCTURED LIPID COMPOSITIONS AND METHODS OF FORMULATION THEREOF (75) Inventors: Lawrence Paul Klemann, Annandale, NJ (US); John Westcott Finley, Baton Rouge, LA (US)

(73) Assignee: Kraft Foods Global Brands LLC, Northfield, IL (US)

(*) Notice: Subject to any disclaimer, the term of this patent is extended or adjusted under 35 U.S.C. 154(b) by 915 days.

(21) Appl. No.: 11/937,046

(22) Filed: Nov. 8, 2007

(65) Prior Publication Data

US 2009/0123634 A1 May 14, 2009

(51) Int. Cl.
  *A23D 9/00* (2006.01)
  *C12P 7/64* (2006.01)
(52) U.S. Cl. ........................................ 426/606; 426/607
(58) Field of Classification Search .................. 426/601, 426/606, 607
  See application file for complete search history.

(56) References Cited

U.S. PATENT DOCUMENTS

| | | | |
|---|---|---|---|
| 2,614,937 A | 10/1952 | Bauer et al. |
| 2,615,159 A | 10/1952 | Jackson |
| 2,615,160 A | 10/1952 | Baur |
| 3,192,057 A | 6/1965 | Hines et al. |
| 3,388,085 A | 6/1968 | Levkoff et al. |
| 4,272,548 A | 6/1981 | Gatzen et al. |
| 4,341,813 A | 7/1982 | Ward |
| 4,364,868 A | 12/1982 | Hargreaves |
| 4,390,561 A | 6/1983 | Blair et al. |
| 4,436,760 A | 3/1984 | Verhagen et al. |
| 4,447,462 A | 5/1984 | Tafuri et al. |
| 4,479,976 A | 10/1984 | Lansbergen et al. |
| 4,486,457 A | 12/1984 | Schijf et al. |
| 4,504,503 A | 3/1985 | Biernoth et al. |
| 4,567,056 A | 1/1986 | Schmidt |
| 4,671,963 A | 6/1987 | Germino et al. |
| 4,832,975 A | 5/1989 | Yang |
| 4,839,190 A | 6/1989 | Bumbalough |
| 4,839,192 A | 6/1989 | Sagi et al. |
| 4,865,866 A | 9/1989 | Moore |
| 4,873,109 A | 10/1989 | Tanaka et al. |
| 4,880,646 A | 11/1989 | Lew et al. |
| 4,883,684 A | 11/1989 | Yang |
| 4,915,971 A | 4/1990 | Fennema et al. |
| 5,064,670 A | 11/1991 | Hirshorn et al. |
| 5,066,510 A | 11/1991 | Ehrman et al. |
| 5,071,669 A | 12/1991 | Seiden |
| 5,130,151 A | 7/1992 | Averbach |
| 5,142,071 A | 8/1992 | Kluesener et al. |
| 5,142,072 A | 8/1992 | Stipp et al. |
| 5,240,726 A | 8/1993 | Zook et al. |
| 5,258,197 A | 11/1993 | Wheeler et al. |
| 5,268,198 A | 12/1993 | Yamasaki et al. |
| 5,288,512 A | 2/1994 | Seiden |
| 5,288,619 A | 2/1994 | Brown et al. |
| 5,312,836 A | 5/1994 | Bistrian |
| 5,362,508 A | 11/1994 | Wheeler et al. |
| 5,374,438 A | 12/1994 | Yost |
| 5,378,490 A | 1/1995 | Wheeler et al. |
| 5,380,544 A | 1/1995 | Klemann et al. |
| 5,382,440 A | 1/1995 | Sullivan |
| 5,391,383 A | 2/1995 | Sullivan et al. |
| 5,407,695 A | 4/1995 | Wheeler et al. |
| 5,411,756 A | 5/1995 | Wheeler et al. |
| 5,419,925 A | 5/1995 | Seiden et al. |
| 5,422,131 A | 6/1995 | Elsen et al. |
| 5,434,278 A | 7/1995 | Pelloso et al. |
| 5,456,939 A | 10/1995 | Wheeler et al. |
| 5,458,910 A | 10/1995 | Gruetzmacher et al. |
| 5,470,598 A | 11/1995 | Scavone |
| 5,490,995 A | 2/1996 | Corrigan |
| 5,492,714 A | 2/1996 | Guskey et al. |
| 5,504,231 A | 4/1996 | Guskey |
| 5,552,174 A | 9/1996 | Wheeler et al. |
| 5,565,232 A | 10/1996 | Wheeler et al. |
| 5,589,216 A | 12/1996 | Guskey et al. |
| 5,589,217 A | 12/1996 | Mazurek |
| 5,612,080 A | 3/1997 | Gruetzmacher et al. |
| 5,662,953 A * | 9/1997 | Wheeler et al. ............... 426/2 |
| 5,683,738 A | 11/1997 | Gruetzmacher et al. |
| 5,843,497 A | 12/1998 | Sundram et al. |
| 5,863,589 A | 1/1999 | Covington, Jr. et al. |
| 5,879,735 A | 3/1999 | Cain et al. |
| 5,912,042 A | 6/1999 | Cain et al. |
| 6,022,577 A | 2/2000 | Chrysam et al. |
| 6,033,703 A | 3/2000 | Roberts et al. |
| 6,106,885 A | 8/2000 | Huizinga et al. |
| 6,140,520 A | 10/2000 | Hartel et al. |

(Continued)

FOREIGN PATENT DOCUMENTS

CA   2 212 467 C   10/2006

(Continued)

OTHER PUBLICATIONS

Lee, Ki-Teak. 1998. JAOCS 75(4)495.* Fomuso, Lydia. 1997. JAOCS 74(3)269.*
Huang, K. 1996. JAOCS 73(2)245.*
Swern, D. editor. 1979. Bailey's Industiral Oil and Fat Products, vol. 1, 4th edition, John wiley & sons, New York, p. 378-379.*
Swern, D. editor. 1979. Bailey's Industrial Oil and Fat Products, vol. 1, 4th edition. John Wiley & sons, New York, p. 19 & 27.*
Martin Anker et al., "Improved Water Vapor Barrier of Whey Protein Films by Addition of an Acetylated Monoglyceride." Innovative Food Science & Emerging Technologies, vol. 3, 2002, pp. 81-92.
I. Greener Donhowe et al., "The Effect of Relative Humidity Gradient on Water Vapor Permeance of Lipid and Lipid-Hydrocolloid Bilayer Films," Journal of the American Oil Chemists' Society, 1992, vol. 69, No. 11, pp. 1081-1087.
Valerie Morillion et al., "Factors Affecting the Moisture Permeability of Lipid-Based Edible Films: A Review," Critical Reviews in Food Science and Nutrition, vol. 42, No. 1, 2002, pp. 67-89.
European Search Report for EP Application No. 08168422, dated Mar. 27, 2009.
Ghosh et al., Moisture Migration Through Chocolate-Flavored Confectionery Coatings, 66 Journal of Food Engineering, 177-186 (2005).

(Continued)

*Primary Examiner* — Carolyn Paden
(74) *Attorney, Agent, or Firm* — Fitch, Even, Tabin & Flannery, LLP (57) ABSTRACT

Lipid compositions comprising specific mixtures of edible synthetic triglycerides are provided that are useful in formulating food products having highly desirable dietary benefits. The novel lipid compositions allow simultaneous access to highly desirable dietary benefits such as delivery of calorie reduction, weight management, health benefits, or any combination thereof, and they also may be formulated trans-fatty acid free.

10 Claims, 1 Drawing Sheet

U.S. PATENT DOCUMENTS

| | | | |
|---|---|---|---|
| 6,238,723 B1 | 5/2001 | Sassen et al. | |
| 6,238,926 B1 | 5/2001 | Liu et al. | |
| 6,277,432 B1* | 8/2001 | Chang | 426/602 |
| 6,369,252 B1* | 4/2002 | Akoh | 554/227 |
| 6,827,963 B2* | 12/2004 | Aoyama | 426/606 |
| 7,229,653 B2 | 6/2007 | Sundram et al. | |
| 7,241,468 B2 | 7/2007 | Naber et al. | |
| 7,517,545 B2 | 4/2009 | Kaimal et al. | |
| 2002/0192318 A1 | 12/2002 | Berry et al. | |
| 2003/0143312 A1 | 7/2003 | Tamarkin et al. | |
| 2003/0215556 A1 | 11/2003 | Naber et al. | |
| 2004/0043125 A1 | 3/2004 | Kaimal et al. | |
| 2004/0049813 A1 | 3/2004 | Russell, Jr. et al. | |
| 2004/0052898 A1 | 3/2004 | Yatka et al. | |
| 2004/0101601 A1 | 5/2004 | Loh et al. | |
| 2004/0122246 A1 | 6/2004 | Sparso et al. | |
| 2004/0166204 A1 | 8/2004 | Smith et al. | |
| 2004/0170720 A1 | 9/2004 | Yatka et al. | |
| 2005/0163909 A1 | 7/2005 | Cleenewerck et al. | |
| 2006/0154986 A1* | 7/2006 | Finley et al. | 514/547 |
| 2007/0082112 A1 | 4/2007 | Kincs et al. | |
| 2007/0172573 A1 | 7/2007 | Higgins | |
| 2007/0178218 A1 | 8/2007 | Yager et al. | |
| 2007/0185340 A1 | 8/2007 | Van Toor et al. | |
| 2007/0231446 A1 | 10/2007 | Nagasawa et al. | |
| 2007/0243308 A1 | 10/2007 | Yu et al. | |
| 2007/0269468 A1 | 11/2007 | Bach et al. | |
| 2009/0123632 A1 | 5/2009 | Klemann et al. | |
| 2009/0123634 A1 | 5/2009 | Klemann et al. | |
| 2009/0123635 A1 | 5/2009 | Klemann et al. | |

FOREIGN PATENT DOCUMENTS

| | | |
|---|---|---|
| EP | 0 322 027 A2 | 6/1989 |
| EP | 0 390 410 A2 | 10/1990 |
| EP | 0 505 408 B1 | 9/1992 |
| EP | 0 506 739 B1 | 10/1992 |
| EP | 0 666 839 B1 | 8/1995 |
| EP | 0 793 421 B1 | 9/1997 |
| EP | 1 051903 A1 | 11/2002 |
| EP | 1586242 | 10/2005 |
| EP | 1 676 484 A1 | 7/2006 |
| EP | 1 759 589 A1 | 3/2007 |
| EP | 1 783 200 A1 | 9/2007 |
| EP | 2 057 902 A1 | 5/2009 |
| GB | 816 343 | 7/1959 |
| GB | 822 730 | 10/1959 |
| GB | 2 239 256 A | 6/1991 |
| JP | 64-019042 A | 1/1989 |
| JP | 02-158695 A | 6/1990 |
| JP | 2001139983 A | 5/2001 |
| JP | 2002-095426 A | 4/2002 |
| JP | 2005237319 | 9/2005 |
| JP | 2006288233 A | 10/2006 |
| JP | 2007215521 A | 8/2007 |
| WO | 91/03944 A1 | 4/1991 |
| WO | 91/09098 A1 | 6/1991 |
| WO | 91/09099 A1 | 6/1991 |
| WO | 91/10368 A1 | 7/1991 |
| WO | 91/15126 A1 | 10/1991 |
| WO | 92/01394 A1 | 2/1992 |
| WO | 92/10105 A1 | 6/1992 |
| WO | 92/15200 A1 | 9/1992 |
| WO | 93/00016 A1 | 1/1993 |
| WO | 94/10126 A1 | 5/1994 |
| WO | 94/12051 A1 | 6/1994 |
| WO | 94/16573 A1 | 8/1994 |
| WO | 94/19961 A1 | 9/1994 |
| WO | 96/32022 A1 | 10/1996 |
| WO | 97/23538 A1 | 7/1997 |
| WO | 98/19554 A1 | 5/1998 |
| WO | 00/15043 A1 | 3/2000 |
| WO | 01/43558 A3 | 6/2001 |
| WO | 02/102169 A1 | 12/2002 |
| WO | 2004/039929 A1 | 5/2004 |
| WO | 2005/011391 A2 | 2/2005 |
| WO | 2005/053767 A1 | 6/2005 |
| WO | 2005/122777 A2 | 12/2005 |
| WO | 2006/002273 A1 | 1/2006 |
| WO | 2006/005141 A2 | 1/2006 |
| WO | 2006/029139 A1 | 3/2006 |
| WO | 2006/052870 A2 | 5/2006 |
| WO | 2006/053097 A1 | 5/2006 |
| WO | 2006/059592 A1 | 6/2006 |
| WO | 2006/076433 A1 | 7/2006 |
| WO | 2007/015519 A1 | 2/2007 |
| WO | 2007/037370 A1 | 4/2007 |
| WO | 2007/141222 A1 | 12/2007 |

OTHER PUBLICATIONS

European Patent Office Extended European Search Report for European Application No. 08168426.8 dated Feb. 6, 2009 (10 pages).

Junichi Ozaki, "Über den relativen Nährwert der synthetischen Fette," Biochemische Zeitschrift, 177, Berlin, 1926, pp. 156-167.

H. C. Eckstein, "The Influence of Diet on the Body Fat of the White Rat," Journal of Biological Chemistry, vol. 81, 1929, pp. 613-628, Harry Sobotka and David Glick, "Lipolytic Enzymes: 1. Studies on the Mechanism of Lipolytic Enzyme Actions," Journal of Biological Chemistry, vol. 105, 1934, pp. 199-219.

L. Emmett Holt, Jr. et al., "Studies in Fat Metabolism," Journal of Pediatrics, vol. 6, No. 4, Apr. 1935, pp. 427-480.

S. S. Weinstein and A. M. Wynne, "Studies on Pancreatic Lipase II. Influence of Various Components on the Hydrolytic Activity," Journal of Biological Chemistry, vol. 112, 1936, pp. 649-660.

Fritz Schønheyder and Kirsten Volqvartz, "On the Activity of Lipases Toward Triglycerides," Enzymologia Acta Biocatalytica, Elsevier Publishing Company Inc., New York, vol. XI, 1943, pp. 178-185.

F. L. Jackson, R. L. Wille, and E. S. Lutton, "The Polymorphism of 2-Acetyl-, 2-Butyryl- and 2-Caproyldistearin and -dipalmitin," Journal of the American Chemical Society, vol. 73, 1951, pp. 4280-4284.

F. L. Jackson and E. S. Lutton, "The Polymorphism of 1-Stearyl- and 1-Palmityldiacetin, -dibutyrin, -dicaproin and 1-Stearyldipropionin," Journal of the American Chemical Society, vol. 74, Oct. 5, 1952, pp. 4827-4829.

Herbert A. Ravin and Arnold M. Seligman, "Determinants for the Specificity of Action of Pancreatic Lipase," Archives of Biochemistry and Biophysics, Academic Press, Inc., vol. 42, No. 2, Feb. 1953, pp. 337-354.

Fred J. Baur, "Acetin Fats. I. Products Made from Mixed Acetin Fats," Journal of the American Oil Chemists' Society, vol. 31, Apr. 1954, pp. 147-151.

H. J. Deuel, Jr., "III. Digestibility of Fats," The Lipids: Their Chemistry and Biochemistry, vol. II, Interscience Publishers, 1955, pp. 218-227.

R. O. Feuge, "Acetoglycerides—New Fat Products of Potential Value to the Food Industry," Food Technology, vol. 9, 1955, pp. 314-318.

Selma E. Snyderman, Soledad Morales, and L. Emmett Holt, Jr., "Premature Infants," Archives of Disease in Childhood, British Medical Association, London, vol. XXX, 1955, pp. 83-84.

Anthony M. Ambrose and Dorothy J. Robbins, "Studies on Comparative Absorption and Digestibility of Acetoglycerides," Journal of Nutrition, vol. 58, 1956, pp. 113-124.

F. H. Mattson et al., "Short-Term Feeding Studies on Acetin Fats," Journal of Nutrition, vol. 59, No. 2, Jun. 1956, pp. 277-285.

Hans Kaunitz et al., "Nutritional Properties of the Triglycerides of Saturated Fatty Acids of Medium Chain-Length," Journal of the American Oil Chemists' Society, vol. 35, Jan. 1958, pp. 10-13.

K. K. Carroll, "Digestibility of Individual Fatty Acids in the Rat," Journal of Nutrition, vol. 64, 1958, pp. 399-410.

F. H. Mattson, "The Absorbability of Stearic Acid When Fed as a Simple or Mixed Triglyceride," Journal of Nutrition, vol. 69, 1959, pp. 338-342.

E. D. Wills, "Studies on the Purification and Specificity of Pancreatic Lipase," The Enzymes of Lipid Metabolism, Pergamon Press, New York, 1961, pp. 13-19.

G. Clement, J. Clement, and J. Bezard, "Action of Human Pancreatic Lipase on Synthetic Mixed Symmetrical Triglycerides of Long-Chain Acids and Butyric Acid," Biochemical and Biophysical Research Communications, vol. 8, No. 3, 1962, pp. 238-242.

P. Desnuelle and P. Savary, "Specificities of Lipases," Journal of Lipid Research, vol. 4, No. 4, Oct. 1963, pp. 369-384.

R. D. Coleman, L. A. Gayle, and Roslyn B. Alfin-Slater, "A Nutritional Evaluation of Acetostearins in Rats," Journal of the American Oil Chemists' Society, vol. 40, Dec. 1963, pp. 737-742.

J. W. McAtee, C. O. Little, and G. E. Mitchell, Jr., "Utilization of Rumen Metabolites as Energy Sources in Rats," Life Sciences, vol. 7, No. 14, 1968, pp. 769-775.

R. M. Tomarelli et al., "Effect of Positional Distribution on the Absorption of the Fatty Acids of Human Milk and Infant Formulas," Journal of Nutrition, vol. 95, 1968, pp. 583-590.

N. V. Lovegren and M. S. Gray, "Polymorphism of Saturated Triglycerides: I. 1,3-Distearo Triglycerides," Journal of the American Oil Chemists' Society, vol. 55, Mar. 1978, pp. 310-316.

Sami A. Hashim and Vigen K. Babayan, "Studies in man of partially absorbed dietary fats," American Journal of Clinical Nutrition, vol. 31, Oct. 1978, pp. S273-S276.

Fred H. Mattson, Granville A. Nolen, and Marjorie R. Webb, "The Absorbability by Rats of Various Triglycerides of Stearic and Oleic Acid and the Effect of Dietary Calcium and Magnesium," Journal of Nutrition, vol. 109, 1979, pp. 1682-1687.

Marvin W. Formo et al., "Fatty Acids," Bailey's Industrial Oil and Fat Products, vol. 1, Fourth Edition, John Wiley & Sons, New York, 1979, pp. 16-17.

J. H. Cummings, "Short chain fatty acids in the human colon," Gut, vol. 22, 1981, pp. 763-779.

Chi-Sun Wang et al., "Studies on the Substrate Specificity of Purified Human Milk Bile Salt-activated Lipase," Journal of Biological Chemistry, vol. 258, No. 15, Aug. 10, 1983, pp. 9197-9202.

James F. Mead et al., "Nutritional Value of Lipids," Lipids Chemistry, Biochemistry, and Nutrition, Plenum Press, New York, 1986, Chapter 19, pp. 459-473.

V. K. Babayan, "Medium Chain Triglycerides," Dietary Fat Requirements in Health and Development, American Oil Chemists' Society, Illinois, 1988, Chapter 5, pp. 73-86.

Casimir C. Akoh and Barry G. Swanson, "Preparation of Trehalose and Sorbitol Fatty Acid Polyesters by Interesterification," Journal of the American Oil Chemists' Society, vol. 66, No. 11, Nov. 1989, pp. 1581-1587.

Ronald P. Mensink and Martijn B. Katan, "Effect of Dietary Trans Fatty Acids on High-Density and Low-Density Lipoprotein Cholesterol Levels in Healthy Subjects," New England Journal of Medicine, vol. 323, No. 7, Aug. 16, 1990, pp. 439-445.

Joanne P. Kennedy, "Structured Lipids: Fats of the Future," Food Technology, Nov. 1991, pp. 76-83.

Life Sciences Research Office, "The Evaluation of the Health Aspects of Using Certain Triacylglycerols as Food Ingredients," Federation of American Societies for Experimental Biology, Maryland, Aug. 1993, 73 pages.

Journal of Agricultural and Food Chemistry, American Chemical Society, vol. 42, No. 2, Feb. 1994, pp. 432-604.

Lawrence P. Klemann et al., "Random Nature of Triacylglycerols Produced by the Catalyzed Interesterification of Short- and Long-Chain Fatty Acid Triglycerides," Journal of Agricultural and Food Chemistry, vol. 42, No. 2, 1994, pp. 442-446.

L. P. Klemann et al., "Estimation of the Absorption Coefficient of Stearic Acid in SALATRIM Fats," Journal of Agricultural and Food Chemistry, vol. 42, No. 2, 1994, pp. 484-488.

John W. Finley et al., "Growth Method for Estimating the Caloric Availability of Fats and Oils," Journal of Agricultural and Food Chemistry, vol. 42, No. 2, 1994, pp. 489-494.

Johnnie R. Hayes et al., "In Vivo Metabolism of SALATRIM Fats in the Rat," Journal of Agricultural and Food Chemistry, vol. 42, No. 2, 1994, pp. 500-514.

Lawrence P. Klemann, "Effects of Interesterification on the Physical Properties of Fats," Abstract of presentation at the AOCS International Conference on the Physical Properties of Fats, Oils and Emulsifiers, Chicago, Illinois, Sep. 1997, one page.

Mark Dreher et al., "Salatrim: A Triglyceride-Based Fat Replacer," Nutrition Today, vol. 33, No. 4, Jul./Aug. 1998, pp. 164-170.

"Solid Fat Content (SFC) by Low Resolution Nuclear Magnetic Resonance—The Direct Method," Sampling and Analysis of Commercial Fats and Oils, AOCS Official Method Cd 16b-93, Revised 1999, pp. 1-10.

Emile A. M. de Deckere et al., "Effects of conjugated linoleic acid (CLA) isomers on lipid levels and peroxisome proliferation in the hamster," British Journal of Nutrition, vol. 82, No. 4, 1999, pp. 309-317.

Ikuo Ikeda, "Digestion and Absorption of Structured Lipids," Fat Digestion and Absorption, American Oil Chemists' Society, Illinois, 2000, Chapter 11, pp. 235-243.

Michael H. Auerbach, Lawrence P. Klemann, and Jenifer A. Heydinger, "Reduced-Energy Lipids," Structured and Modified Lipids, CRC Press, New York, 2001, Chapter 18, pp. 485-510.

James P. Miller, "ADM to enter joint venture for cooking oil," Chicago Tribune, Jun. 13, 2001, 2 pages.

David Jago, "Health Begets Wealth," Prepared Foods, Apr. 2001, pp. 21-22.

Robyn M. Treadwell et al., "Glyceride Stearic Acid Content and Structure Affect the Energy Available to Growing Rats," Journal of Nutrition, vol. 132, 2002, pp. 3356-3362.

Casimir C. Akoh and Kuan-Hsiang Huang, "Enzymatic Synthesis of Structured Lipids: Tranesterification of Triolein and Caprylic Acid," Journal of Food Lipids, vol. 2, Issue 4, Dec. 1995, pp. 219-230.

Ki-Teak Lee and Casimir C. Akoh, "Characterization of Enzymatically Synthesized Structured Lipids Containing Eicosapentaenoic, Docosahexaenoic, and Caprylic Acids," Journal of the American Oil Chemists' Society, vol. 75, No. 4, Apr. 1998, pp. 495-499.

H. T. Osborn and C. C. Akoh, "Structured Lipids—Novel Fats with Medical, Nutraceutical, and Food Applications," Comprehensive Reviews in Food Science and Food Safety, vol. 3, Jan. 2002, pp. 93-103.

European Patent Office Extended Search Report for European Application No. 08167992.0 dated Feb. 25, 2009 (12 pages).

Kevin C. Maki et al., "Consumption of diacylglycerol oil as part of a reduced-energy diet enhances loss of body weight and fat in comparison with consumption of a triacylglycerol control oil," American Journal of Clinical Nutrition, vol. 76, 2002, pp. 1230-1236.

P. S. Maclean et al., "Caloric Availability of Fats," Center for Human Nutrition, University of Colorado HSC, Kraft Foods Sponsored Research, Jan. 4, 2004, 13 pages.

Paul S. Maclean et al., "Metabolic adjustments with the development, treatment, and recurrence of obesity in obesity-prone rats," American Journal of Physiology—Regulatory, Integrative and Comparative Physiology, vol. 287, Aug. 2004, pp. R288-R297.

Arunabh Bhattacharya et al., "The Combination of Dietary Conjugated Linoleic Acid and Treadmill Exercise Lowers Gain in Body Fat Mass and Enhances Lean Body Mass in High Fat Fed Male Balb/C Mice," Journal of Nutrition, vol. 135, 2005, pp. 1124-1130.

Iwona Rudkowska et al., "Phytosterols mixed with medium-chain triglycerides and high-oleic canola oil decrease plasma lipids in overweight men," Metabolism Clinical and Experimental, vol. 55, 2006, pp. 391-395.

Kartha, A., "Some Deviations from 1, 3-Random 2-Random Distribution in Natural Fats." Journal of the American Oil Chemists' Society, 1968, vol. 45, pp. 101-102.

G.R. List et al., "Margarine and Shortening Oils by Interesterification of Liquid and Trisaturated Triglycerides." Journal of the American Oil Chemists' Society, vol. 72, No. 3, 1995, pp. 379-382.

G.R. List et al., "Preparation and Properties of Zero Trans Soybean Oil Margarines." Journal of the American Oil Chemists' Society, vol. 72, No. 3, 1995, pp. 383-384.

V. Petrauskaite et al., "Physical and Chemical Properties of trans-Free Fats Produced by Chemical Interesterification of Vegetable Oil Blends." Journal of the American Oil Chemists' Society, vol. 75, No. 4, 1998, pp. 489-493.

J. Gresti et al., "Composition of Molecular Species of Triacylglycerols in Bovine Milk Fat." Journal of Dairy Science, vol. 76, 1993, pp. 1850-1869.

L.H. Meyer, "Food Chemistry." Reinhold Publishing Corporation, New York, 1960, p. 33.

"MultOil: A Multi-functional oil for the food industry." Enzymotec Ltd, Migdal HaEmeq, Israel, believed to be published at least by about 2003, 4 pages.

* cited by examiner

US 8,206,772 B2

STRUCTURED LIPID COMPOSITIONS AND METHODS OF FORMULATION THEREOF

FIELD OF THE INVENTION

The present invention relates generally to structured lipids and methods of preparing them. More particularly, the present invention relates to structured lipid compositions containing triglycerides bearing combinations of short chain, medium chain, and/or long chain residues such that the structured lipid component includes, for example, the capacity to simultaneously provide dietary and other health benefits, calorie reduction, weight management, and the like.

BACKGROUND OF THE INVENTION

Dietary fat is the most concentrated source of energy of all the nutrients, typically supplying about 9 kcal/gram, which generally exceeds the caloric content provided by either dietary carbohydrates or protein. Fat contributes to the palatability and flavor of food, since most food flavors are fat-soluble, and to the satiety value, since fatty foods remain in the stomach for longer periods of time than do foods principally containing protein and carbohydrate. Furthermore, fat is a carrier of the fat-soluble vitamins A, D, E, and K and the essential fatty acids, which have been shown to be important in growth and in the maintenance of many body functions. Major research efforts have focused on ways to produce food substances that provide similar functional and organoleptic properties as fats at reduced caloric content but which are not readily perceived as being synthetic by consumers.

The most abundant group of fats are triglyceride-esters of fatty acids with glycerol (1,2,3-propanetriol). The health benefits of dietary omega 3, 6, and 9 fatty acids have been widely reported. See, e.g., Kennedy, "Structured Lipids: Fats of the Future," *Food Technology*, November 1991, 76-83. Natural fats have a broad range of functionalities and are handled in different ways by the human digestive process. Early studies reported that triglyceride fats having high melting points were less digestible (Deuel, *The Lipids*, Vol. II, Interscience Publishers, 1955, pages 218 to 220). Later investigators questioned the relationship between digestibility and melting points, and scrutinized instead chain length and degree of unsaturation of fatty acid substituents. Using a rat model, straight chain, saturated fatty acids having 4 to 10 carbon atoms were completely digested, those having 10 to 18 carbons progressively less digested, and those having 18 or higher only slightly absorbed; and monounsaturated acids were about the same as saturated acids (Carroll, *J. Nutr.* 64: 399-410 (1957) at 408).

Other prior triglyceride metabolic studies found only limited areas of predictability. In one human study, a coconut oil fraction containing predominantly saturated, long chain triglycerides bearing 89 percent stearic (C18) and 11 percent palmitic (C16) acid residues provided 31 percent absorption, as compared to 98 percent for corn oil (Hashim et al., *Am. J. Clin. Nutr.* 31: S273-276 (1978)). However, it was found that increasing the stearic acid content of dietary fat did not per se decrease absorbability; rather, absorbability could be decreased by increasing the amount of tristearin present (i.e., triglycerides having three stearic residues; see Mattson, *J. Nutr.* 69: 338-342 (1959)). Another study found that, in the presence or absence of dietary calcium and magnesium, stearic acid was well absorbed by rats when esterified on the 2-position of triglycerides having oleic acid at the 1- and 3-positions, but absorption decreased when a second stearic was added to the 1-position (Mattson et al., *J. Nutr.* 109: 1682-1687 (1979), Table 3, page 1685). Stearic acid in the 1-position was well absorbed from triglycerides having oleic in the 2- and 3-positions in the absence, but not in the presence, of dietary calcium and magnesium (ibid.). With stearic acid in both the 1- and 3-positions, absorption decreased with or without dietary calcium and magnesium; the effect was more pronounced when calcium and magnesium were sufficient (ibid.).

The digestibility of palmitic acid has also been studied. Palmitic acid reportedly was better absorbed by rats when situated at the 2-position of triglycerides than at the 1- or 3-positions in naturally occurring fats commonly fed to human infants, and total fat absorption was adversely influenced by increasing the palmitic acid and stearic acid content in the 1- and 3-positions (Tomerelli et al., *J. Nutr.* 95: 583-590 (1968)).

While triglycerides high in stearic acid are less well utilized, they also tend to be high melting. Tristearin is a solid at room temperature; the alpha form is a white powder that melts at 55° C., which, on solidification, reverts to the beta form that melts again at 72° C. The melting points of 1,3-distearin with short or medium chain fatty acids at the 2-position have been indicated to be high (Lovegren et al., *J. Amer. Oil Chem. Soc.* 55: 310-316 (1978)). Symmetrical di-saturated triglycerides of stearic acid and/or palmitic acid, often with oleic acid at the 2-position, melt fairly uniformly near body temperature, and this property is advantageous for cocoa butter and hard butter substitutes (see, for example, U.S. Pat. Nos. 4,364,868, 4,839,192, and 4,873,109), and for hardstocks for margarines and shortenings (see, for example, U.S. Pat. Nos. 4,390,561, 4,447,462, 4,486,457, 4,865,866, and 4,883,684). Because of their functionality, high melting, high stearic fats generally have limited applications in food compositions as compared to more plastic or liquid triglycerides.

Fats have been prepared by substituting acetic acid for a portion of the fatty acids occurring in ordinary fats or oils, thus producing triglycerides bearing short acetyl and longer substituents. For saturated fats high in stearic acid, the substitution of acetyl groups for a portion of the stearyl groups lowers the melting point. These aceto-glycerides were investigated during the 1950's and found to be digestible. Animal feeding studies indicated that the nutritive value of mono- and di-acetin fats were essentially the same as the corresponding conventional triglycerides (Mattson et al., *J. Nutr.* 59: 277-285 (1956)), although acetooleins were more digestible than acetostearins (Ambrose et al., *J. Nutr.* 58: 113-124 (1956)). Animals grew poorly when fed acetostearin as the sole dietary fat (Coleman et al., *J. Amer. Oil Chem. Soc.* 40: 737-742 (1963)).

While lower melting than tristearin, acetostearins still have high melting points, limiting applications in food products requiring plastic or liquid fats. In fact, though melting points of structurally related compounds generally decrease with decreasing molecular weight (and mono- and distearins having medium to long saturated substituents follow this rule), the melting points of triglycerides in the C18CnC18 and CnCnC18 series, where n is 2 to 6, anomalously show the high molecular weight C6 (caproic acid) mono- and distearin derivatives to have the lowest melting points and the lower molecular weight C2 (acetic acid) mono- and distearin derivatives to have the highest (Jackson et al., *J. Amer. Chem. Soc.* 73: 4280-4284 (1951) and Jackson et al., *J. Amer. Chem. Soc.* 74: 4827-4829 (1952)). Plastic fats containing acetostearins suggested for use as shortenings and the like were formulated to contain significant levels of unsaturated fats and typically employed significant levels of fatty acids which would yield high saponification numbers or were liquid at room temperature (U.S. Pat. No. 2,614,937 and Baur, *J. Amer. Oil Chem. Soc.* 31: 147-151 (1954)).

Acetostearins are waxy fats having sharp melting points. In contrast to fats bearing medium and/or long substituents, acetostearins also exhibit unusual polymorphism (Feuge, *Food Technology* 9: 314-318 (1955)). Because of their melting and crystal properties, these fats have been suggested as useful for coating food products such as meat, fish, cheese, and candy (U.S. Pat. Nos. 2,615,159 and 2,615,160). Such compositions are often referred to as "hot melts" and may contain antibiotics (U.S. Pat. No. 3,192,057) or polymeric materials (U.S. Pat. No. 3,388,085) to prolong the life of the coating.

The short chain fatty acids (e.g., acetic, propionic, and butyric acid) or so-called volatile fatty acids, occur in the large intestine of mammalian species (Cummings, *Gut* 22: 763-779 (1981)). Except for a small percentage of butyric acid in milk fat (i.e., about 3.5 to 4 percent), volatile fatty acids rarely occur in nature esterified to glycerol in fats, but are generally by-products of fermentation in the gut. Physically, short chain fatty acids have been characterized as "not at all 'fatlike' in character; in fact they are hydrophilic substances with complete miscibility with water" (*Bailey's Industrial Oil and Fat Products*, 4th. Ed., J. Wiley, New York, 1979, volume 1, pages 16 to 17).

Early studies investigating the metabolism of short acids and triglycerides bearing short chain residues did not show a regular relationship between nutritional value and the number of carbon atoms in the fat (Ozaki, *Biochem. Z.* 177: 156-167 (1926) at 163). For example, when fed to rats at levels of 5 percent and 10 percent of the diet, triacetin and tributyrin were nutritious, yielding weight gains in the top 20 to 25 percent of the fats tested, whereas tripropionin and triisovalerin were toxic. In 1929, Eckstein reported that rats fed triolein and sodium butyrate grew at the same rate (*J. Biol. Chem.* 81: 163-628 (1929) at 622).

In 1935, Holt et al. observed that infants fed milk enriched with tributyrin retained more fat per day (90.1 to 90.2 percent) than those in a butterfat control group (88.9 percent); the study concluded that absorption was favored by fatty acids with relatively short chains (*J. Ped.* 6: 427-480 (1935), Table VIII, page 445, and Conclusions, number 4, page 477). Similar results were obtained with triacetin, with absorption of tributyrin and triacetin reportedly superior to that of corn oil, although corn oil yielded higher calorie level (Snyderman et al., *Arch. Dis. Childhood* 30: 83-84 (1955)). Substitution of triacetin, tripropionin, or tributyrin for half the glucose and starch in a rat diet did not significantly affect the digestible, metabolizable, or net energy measurements, but lower body weight gains were observed in animals fed tributyrin in two experiments and triacetin in one experiment (McAtee et al., *Life Sci.* 7: 769-775 (1968)).

Based on in vitro digestibility studies, tributyrin is readily cleaved by pancreatic lipase. Data measuring lipolysis as a function of chain length show tributyrin much more rapidly hydrolyzed than other substrates (see Sobotka et al., *J. Biol. Chem.* 105: 199-219 (1934), comparing triglycerides bearing three identical $C_4$ to $C_{18}$ acyl groups, and Desnuelle et al., *J. Lipid Res.* 4: 369-384 (1963), comparing triglycerides bearing three identical $C_2$ to $C_{18}$ acyl groups); some reports, however, rank tripropionin slightly better (Weinstein et al., *J. Biol. Chem.* 112: 641-649 (1936)), comparing triglycerides bearing three identical C2 to C6 acyl groups, and Wills, in *The Enzymes of Lipid Metabolism*, (Desnuelle, P., Ed.), Pergamon Press, N.Y., 1961, pages 13 to 19, comparing triglycerides bearing three identical C2 to C18 acyl groups). In fact, because tributyrin is such a good substrate and because the triglyceride is sufficiently water-soluble to allow enzymatic measurements in a homogeneous solution, it is often selected as a lipase substrate standard (Ravin et al., *Arch. Biochem. Biophys.* 42: 337-354 (1953) at 353).

Other lipase preparations readily cleave short chain triglycerides. Tributyrin was found to be hydrolyzed with the greatest initial velocity by human milk lipase, while pig liver lipase hydrolyzed tripropionin and tributyrin with an initial velocity much greater than any other in a study comparing C2 to C18 triglycerides (Schonheyder et al., *Enzymologia* 11: 178-185 (1943)). Tributyrin was hydrolyzed more readily than $C_6$ to $C_{18}$ triglycerides by human milk bile salt-activated lipase (Wang et al., *J. Biol. Chem.* 258: 9197-9202 (1983)). A liver lipase hydrolyzed trivalerin the fastest, with tributyrin the second fastest (Sobotka et al., *J. Biol. Chem.* 105:199-219 (1934)).

In contrast to triglycerides bearing long chain (about $C_{16}$ to $C_{24}$) fatty acids and those bearing short chain fatty acids, medium chain triglycerides, generally obtained from kernel oils or lauric fats and encompassing those substituted with C6 to C12, predominantly C8 to C10, fatty acids, have been of particular interest because they are more rapidly absorbed and metabolized, via a different catabolic route than those bearing long chain fatty acids (see Babayan, in *Dietary Fat Requirements in Health and Development*, (Beare-Rogers, J., ed.), A.O.C.S. 1988, Chapter 5, pages 73 to 86). Hence, medium chain triglycerides have been employed in premature infant formulas and in the treatment of several malabsorption syndromes. Feeding studies by Kaunitz et al., demonstrated the usefulness of medium chain triglycerides in weight maintenance and obesity control in rats (*J. Amer. Oil Chem. Soc.* 35: 10-13 (1957)).

Several research groups have exploited the physical and nutritional properties of medium chain fatty acids by suggesting that triglycerides having stearic and/or behenic acid in combination with medium chain substituents could be used as low calorie fats. See, e.g., European Patent Application Publication No. 0 322 027 B1 (May 19, 1993), (medium chain substituents defined as C6 to C10 residues), and Japanese Patent Publication No. 2-158, 695 (Jun. 19, 1990), (medium chain substituents defined as C4 to C12 residues). The latter publication, however, exemplified only trace amounts of C4 fatty acids, and suggested incorporating 0 to 1 long chain, unsaturated residues as well. Low calorie triglyceride mixtures having stearic acid at the 1-position and medium and unsaturated residues in the other positions have also been suggested (U.S. Pat. No. 4,832,975).

The polymorphism of triglycerides bearing medium and long moieties generally resemble fats bearing long moieties in that they tend to have a stable beta crystal structure. This contributes to graininess of fat mixtures containing them, and to the appearance of bloom in chocolate compositions. The preparation of smooth blends require careful substituent selection and/or tempering. It would be desirable to have low calorie fat mixtures free of this disadvantage. It would also be desirable to have a fat which was a true triglyceride but which delivered a minimum of calories and exhibited functionalities which permitted use in a wide variety of products.

U.S. Pat. No. 6,369,252 describes structured lipids and mixtures thereof and enzymatic methods with lipase for forming them. According to this patent, the rate of autoxidation and melting properties of triacylglycerols can be affected by the position of unsaturated fatty acids in the triacylglycerol molecule. Thus, triacyl-glycerols having unsaturated fatty acids at the 2-position are more stable toward oxidation than those linked at the 1- and 3-positions. U.S. Pat. No. 6,277,432 describes plastic fat compositions based on mixtures of tria- cylglycerides having various combinations of short, saturated long chain, and unsaturated long chain fatty acid residues in which 40-95 percent of the mixture comprises di-short chain species and 3-40 percent of the fatty acid moieties, including ones at the 2-position, are unsaturated long chain.

U.S. Pat. No. 5,380,544 describes novel triacylglycerol compositions containing at least 24 percent of novel structures with a short (S), medium (M), and long (L) chain saturated fatty acid randomly distributed among the three available triacylglycerol positions. The compositions belong to a class of reduced calorie fats useful for the formulation of table spreads and other food products. The random arrangement of fatty acids with respect to glycerol backbone of the triacylglycerols has been confirmed. (See, for example, Klemann et al., *J. Agric. Food Chem.*, "Random Nature of Triacylglycerols Produced by the Catalyzed Interesterification of Short- and Long-Chain Fatty Acid Triglycerides," 1994, 42, 442-446.)

The literature also identifies high melting mono-glyceride and diglyceride by-products of digestion as a source of decreased stearic acid bioavailability. Dreher et al., "Salatrim: A Triglyceride-Based Fat Replacer," *Nutrition Today*, 1998, 33, 164-170. The literature additionally describes research to develop an empirical relationship between caloric availability and triacylglycerol compositions. Klemann et al., "Estimation of the Absorption Coefficient of Stearic Acid in Salatrim Fats," *J. Agric. Food Chem.*, 1994, 42, 484-488. An enhanced rate of cleavage of short chain acids relative to long chain fatty acids in structured triacylglycerols containing both short and long chain acids has been reported (Hayes et al., "*In Vivo Metabolism of Salatrim Fats in the Rat,*" *J. Agric. Food Chem.*, 1994, 42, 500-514). The digestion and absorption of structured lipids containing medium- and long-chain fatty acids has been described in the literature. *Fat Digestion and Absorption*, Chapter 11, "Digestion and Absorption of Structured Lipids," pp. 235-243, AOC Press 2000. The use of lipid structure components to reduce available caloric content of a food ingredient has been suggested. *Structured and Modified Lipids*, Chapter 18, Auerbach, et al., "Reduced-Energy Lipids", Marcel Dekker, pp. 485-510. The literature has also suggested that certain commercial cooking oil products containing 80 percent diacylglycerol structure from soy and rapeseed are less likely than other oils to deposit as excess adipose tissue in the body. See, e.g., Jago, "Health Begets Wealth," *Prepared Foods*, 21-22, April 2001. A method to determine the bioavailable energy from fat or oil also has been described. Finley et al., "Growth Method for Estimating the Caloric Availability of Fats and Oils," *J. Agric. Food Chem.*, 1994, 42, 489-494. Some commercially available synthetic fats and oils have been touted as delivering calorie reduction, or weight management, or health benefits, as mutually exclusive properties.

SUMMARY OF THE INVENTION

The present invention generally relates to structured lipid compositions useful in formulating food products. The lipid composition includes a mixture of edible, synthetic triglycerides having fatty acids $R_1$, $R_2$, and $R_3$ esterified to a glycerol moiety of general formula (A)

wherein each $R_1$, $R_2$, and $R_3$ independently comprises a fatty acid residue having 2 to 24 carbon atoms inclusive. For purposes herein, a structured lipid composition shall mean a lipid having region specific placement of specific fatty acids at one of the $R_1$, $R_2$, or $R_3$ positions.

In one form, at least about 14 weight percent, preferably about 14-30 weight percent, more preferably about 30-60 weight percent, and most preferably 60-95 weight percent of the triglycerides in the mixture have at least (1) two of the R groups independently selected from the group consisting of a saturated short chain fatty acid residue ("S") having 2 to 4 carbon atoms inclusive and a saturated medium chain fatty acid residue ("M") having 6 to 12 carbon atoms inclusive; and (2) the remaining R group as an unsaturated long chain fatty acid residues ("U") having between 14 to 24 carbon atoms inclusive.

In a particularly preferred form, such mixture includes at least about 14 weight percent triglycerides having at least: (1) $R_2$ groups independently selected from the group consisting of a saturated short chain fatty acid residue ("S") having 2 to 4 carbon atoms inclusive and a saturated medium chain fatty acid residue ("M") having 6 to 12 carbon atoms inclusive; (2) at least one of end groups $R_1$ and $R_3$ groups has an unsaturated long chain fatty acid residue ("U") having between 14 to 24 carbon atoms inclusive; and (3) the other of end groups $R_1$ and $R_3$ is a short chain fatty acid residue having 2 to 4 carbon atoms inclusive ("S"), a medium chain fatty acid residue having 6 to 12 carbon atoms inclusive ("M"), or an unsaturated long chain fatty acid residue having 14 to 24 carbon atoms inclusive ("U").

The mixture of lipid compositions herein also preferably have a molar ratio of the short chain fatty acid residues (S), plus medium chain fatty acid residues (M), ("S+M") versus long chain saturated and unsaturated fatty acid residues having between 14 and 24 carbon atoms inclusive ("L+U") characterized by the general equation (B)

Mixture Molar Ratio=$(S+M)/(L+U)$ (B)

such that the overall mixture molar ratio is about 0.6 to about 3.8, and most preferably, between about 0.6 and about 2.4. With the overall mixture molar ratio (B) between about 0.6 and about 3.8, the mixture of structured triglycerides herein deliver less bioavailable energy than corn oil (i.e., less than about 9 kcal/g). With the overall mixture molar ratio (B) between about 0.6 and about 2.4, the mixture of structured lipid compositions herein deliver less bioavailable energy than corn oil (i.e., less than about 9 kcal/g) and, when digested within the gastrointestinal tract of a mammal, they are absorbed and metabolized into a form effective to shift more energy content thereof to energy expenditure (i.e., "burn") and less to body fat storage (i.e., "store") than a similar amount of digested corn oil. It is believed that the largest caloric reduction is generally found as the ratio approaches the low end of ratio B, and it is believed that the largest burn versus store effect is found approaching the upper end of ratio B. In a preferred form, "L" can be or approach zero; however, in some cases, "L" may also be greater than zero. That is, for example, the overall mixture can include some long chain saturated fatty acids even if the structured lipid as defined above preferably does not include long chain fatty acid residues within its glycerol moiety.

In a preferred embodiment, at least about 14 weight percent, and more particularly at least 31-95 weight percent, of the synthetic triglycerides in the mixture have (1) the $R_2$ groups as a saturated short chain fatty acid residue having 2 to 4 carbon atoms inclusive; (2) one of the $R_1$ or $R_3$ groups as an unsaturated long chain fatty acid residue having 14 to 24 carbon atoms inclusive; and (3) the other of the $R_1$ or $R_3$ groups as a saturated short chain fatty acid residue having 2 to 4 carbon atoms inclusive (i.e., SSU or USS structures). Such mixtures deliver about 7 to about 8 kcal/g of bioavailable energy, and furthermore divert 15-80 percent of this energy to heat versus body fat relative to a corn oil control. This mixture may optionally also contain a certain amount of L groups as described below.

In another form, the mixture may also includes about 30 to about 80 weight percent of triglycerides that include (1) the $R_2$ group as a saturated long chain fatty acid residue having 14 to 24 carbon atoms inclusive (L); (2) one of the $R_1$ or $R_3$ groups as a saturated medium chain fatty acid residue having 6 to 12 carbon atoms inclusive (M); and (3) the other of the $R_1$ or $R_3$ groups as a saturated long chain fatty acid residue having 14 to 24 carbon atoms inclusive (L) (i.e., MLL and/or LLM structures). In such form, the mixture delivers about 4 to about 6 kcal/g of bioavailable energy.

In one aspect, short triglyceride moieties (S) present in the mixture can be derived from acetic acid, propionic acid, butyric acid, or mixtures thereof. Medium triglyceride moieties (M) present in the mixture can be derived from caproic acid, caprylic acid, capric acid, lauric acid, or mixtures thereof. Long unsaturated triglyceride moieties (U) present in the mixture can be derived from palmitoleic acid, oleyl acid, vaccenic acid, linoleic acid, alpha-linolenic acid, gamma-linolenic acid, gadoleic acid, arachidonic acid, eicosapentaenoic acid, erucic acid, docosahexaenoic acid, or mixtures thereof. And, any long saturated (i.e., no carbon to carbon double bonds) triglyceride moieties (L) present in the mixture can be derived from stearic acid, lauric acid, behenic acid, arachidic acid, palmitic acid, or mixtures thereof. Additional lipid compositions and synthetic triacylglycerols provided by methods described herein are also provided.

The lipid compositions described herein exhibit surprising properties. The lipid compositions are reduced calorie, reduced fat compositions or blends that generally deliver less than about 8 kcal/g, particularly less than about 7 kcal/g, and more particularly less than about 6 kcal/g of bioavailable energy while containing substantial health-promoting unsaturated long chain fatty acid residues at the 1- and/or 3-positions. With molar ratios (S+M)/(L+U) preferably between 0.6 and 2.4, such lipid mixtures also optimally enhance (stimulate) mobilization and metabolism of fat stored in adipose tissue for use as energy and are less available for re-synthesis and fat storage (unlike at the 2-position). Reduced calorie lipid compositions are provided without incorporating a high content of saturated long chain fatty acids (L), (e.g., derived from stearic acid), into the triacylglycerol structures. The novel lipid compositions of the present invention also may be formulated trans-fatty acid free (i.e., containing essentially no acyl groups containing trans unsaturation). Lipid compositions of this invention also allow simultaneous dietary access to highly desirable dietary benefits, such as delivery of calorie reduction, weight management, health benefits, and combinations thereof. The constituent synthetic triglycerides of the lipid compositions which, when digested within the gastrointestinal tract of a mammal, are absorbed and metabolized in a manner effective to shift more energy content thereof to energy expenditure and less to body fat storage.

Embodiments of the novel lipid compositions include liquid and substantially liquid oils at normal room temperature conditions, while others are plastic over wide temperature ranges and spreadable at refrigerator temperatures, having stable, non-grainy crystal structures. For example, in one form, the mixtures herein are a substantially liquid oil at about 24° C. The novel lipid compositions and constituent triglycerides are edible and can be used in a variety of processed foods in place of both liquid vegetable oils and hydrogenated fats.

Within the general description set forth above, the present invention relates to novel compositions that may encompass at least two groups of synthetic structured lipids, which for convenience sake here are referenced by their respective preparative procedures: group (I) lipid compositions include triacylglycerols bearing S, M and/or U chain acid residues prepared by stepwise regiospecific enzyme-mediated synthesis; and group (II) lipid compositions are prepared by single step, random interesterification synthesis and comprise (i) triacylglycerol structures bearing S and U chain acid residues alone or in blends with triacylglycerols bearing M and L, or alternatively (ii) S, M and U chain acid residues.

With respect to the group (I) lipid compositions, triacylglycerols bearing short (S), medium (M), and/or unsaturated (U) long chain acid residues are hydrolyzed by endogenous enzymes that release the constituent acids at rates inversely proportional to their relative size. Short chains are cleaved faster than medium chains which are in turn cleaved faster than long acid chains. Therefore, the natural digestive process in a mammal releases metabolizable energy from these structured triacylglycerols in stages, resulting in a sustained source of bioavailable energy over time. This attribute can be exploited in a variety of food product forms that offers new benefits to consumers. The resultant structures are novel compositions that can be produced stepwise by regiospecific enzyme mediated synthesis, and can be concentrated from synthetic mixtures using conventional oil processing and refining technology.

In one embodiment, an MMM (or SSS) triacylglycerol is first reacted with a UUU (or, alternatively, LLL) triacylglycerol in the presence of a 1- and 3-specific enzyme, such as immobilized 1,3-specific lipase, sufficient to form an intermediate product containing UMU (or USU) triglyceride, respectively, and then further reacting the intermediate product with SSS (or MMM), whichever is different than the starting compound, in the presence of the 1- and 3-specific enzyme sufficient to form a UMS (or USM) triglyceride. Compositions that contain the unsaturated long chain acid (U) in the 1- or 3-position are particularly preferred since metabolic pathways will tend to favor utilization for energy as opposed to re-synthesis and fat storage.

The synthetic UMS (or USM) triacylglycerol structures in accordance with embodiments of this invention containing short, medium, and unsaturated long chain acid residues are novel compositions of matter with unique nutritional properties. These oils undergo normal enzymatic hydrolysis to release acids chains at rates inversely proportional to their relative size. It is believed that no structured fat has ever been exploited for this highly desirable benefit. While not intended to be limited by theory, it is believed that short and medium chain acids are rapidly metabolized like carbohydrates to give up their energy, while long chain unsaturated acids are absorbed as free acids or as a 2-monoglyceride and/or 1-monoglyceride, and are metabolized more slowly. Depending on the synthetic methodology employed, the unsaturated acid can occupy a terminal glycerol position in about 67 to about 100 percent of the triacylglycerols. Preferential cleavage of the short or medium chain acyl groups will tend to leave a 1-monoglyceride which is not efficiently available for triacylglyceride re-synthesis and fat storage pathways. Therefore these oils are generally not readily stored as body fat, enhancing their energy and nutritional value and minimizing their storage as body fat.

With respect to the group (II) lipid compositions, single step, randomizing, synthesis of triacylglycerols from fatty acid esters and short (or medium) chain triglycerides provides novel neutral oils that can deliver health promoting fatty acids (e.g., conjugated linoleic acids, omega 3-fatty acids, monounsaturated acids, and the like) and also stimulate mobilization and metabolism of fat stored in adipose tissue. In one aspect, the compositions of these novel oils can range from predominantly USS structures to mixtures of USS, SUS, UUS, and USU molecular forms. Preferred embodiments have about 31 to about 95 percent USS triacylglycerol structures, and deliver about 7 to about 8 kcal/g of bioavailable energy. Also highly desirable blended compositions may be provided that contain mixtures of USS and LLM structures. These deliver about 4 to about 6 kcal/g of bioavailable energy, permit delivery of desired health promoting fatty acids, and enable broad functional application in foods. In an alternative embodiment, novel SMU structures may be derived from random interesterification and isolation techniques. The exploitation of single-step, simple chemistry offers reduced manufacturing costs in comparison to multi-step techniques, as well as lower capital investment and final ingredient costs.

DETAILED DESCRIPTION

This invention is based upon the finding that the dietary and metabolic properties of low calorie, reduced fat lipids can be significantly enhanced by the synthesis of structured triglycerides with either random or regiospecific placement of short and/or medium, and unsaturated long chain acid moieties. Embodiments of the novel structured lipid compositions include liquid and substantially liquid oils at normal room temperature conditions, while others are plastic over wide temperature ranges and spreadable at refrigerator temperatures, having stable, non-grainy crystal structures. The novel structured lipid compositions and constituent triglycerides are edible and can be used in a variety of processed foods in place of both liquid vegetable oils and hydrogenated fats. In a preferred form, the mixture of structured triglycerides is essentially free of trans fatty acids.

Denoting the aliphatic portion of short moieties as S, the medium portion as M, and the unsaturated long portion as U, preferred structured lipid compositions contain a mixture of synthetic triglycerides having at least about 14 weight percent, preferably about 14-30 weight percent, more preferably about 30-60 weight percent, and most preferably 60-95 weight percent, of a mixture of synthetic triglycerides having the following formula (A):

wherein groups $R_1$, $R_2$, and $R_3$ independently comprise a fatty acid residue having 2 to 24 carbon atoms inclusive and wherein at least (1) two of the R groups independently selected from the group consisting of a saturated short chain fatty acid residue ("S") having 2 to 4 carbon atoms inclusive and a saturated medium chain fatty acid residue ("M") having 6 to 12 carbon atoms inclusive; and (2) the remaining R group as an unsaturated long chain fatty acid residues ("U") having between 14 to 24 carbon atoms inclusive. In one preferred form, at least the $R_2$ groups are independently selected from the group consisting of a saturated short chain fatty acid residue (S) having 2 to 4 carbon atoms inclusive or a saturated medium chain fatty acid residue (M) having 6 to 13 carbon atoms inclusive; (2) one of the $R_1$ or $R_3$ groups is an unsaturated long chain fatty acid residues (U) having between 14 to 24 carbon atoms inclusive; and (3) the other of the end groups $R_1$ and $R_3$ is a short chain fatty acid residue having 2 to 4 carbon atoms inclusive ("S"), a medium chain fatty acid residue having 6 to 12 carbon atoms inclusive ("M"), or an unsaturated long chain fatty acid residue having 14 to 24 carbon atoms inclusive ("U"). For purposes herein, the positions of the $R_1$, $R_2$, and $R_3$ fatty acids in formula (A) above (and similar triglyceride formula) will be designated as sn-1, sn-2, and sn-3 or 1-position, 2-position, and 3-position, respectively.

As used herein, a long chain saturated fatty acid residue (L) shall mean a carbon chain having between 14 and 24 carbon atoms inclusive without any unsaturation (i.e., no carbon to carbon double bonds); a medium chain saturated fatty acid residue (M) shall mean a carbon chain having between 6 and 12 carbon atoms inclusive without any unsaturation; a short chain saturated fatty acid residue (S) shall mean a carbon chain having between 2 and 4 carbon atoms inclusive without any unsaturation; and a long chain unsaturated fatty acid residue (U) shall mean a carbon chain having between 14 and 24 carbon atoms inclusive with at least one carbon-carbon double bond.

In a particularly preferred embodiment, at least about 14 weight percent, and more particularly about 31 to about 95 weight percent of the triglycerides in the mixture include: (1) the $R_2$ group as a saturated short chain fatty acid residue having 2 to 4 carbon atoms inclusive; (2) one of the $R_1$ or $R_3$ groups as unsaturated long chain fatty acid residues (U) having between 14 to 24 carbon atoms inclusive; and (3) the other of the $R_1$ or $R_3$ groups as a saturated short chain fatty acid residue having 2 to 4 carbon atoms inclusive (i.e., SSU and/or USS structures). In such form, the mixture of synthetic triglycerides delivers about 7 to about 8 kcal/g of bioavailable energy.

The mixture of structured lipid compositions herein also preferably have a molar ratio of the short chain fatty acid residues (S), plus medium chain fatty acid residues (M), ("S+M") versus long chain saturated and unsaturated fatty acid residues having between 14 and 24 carbon atoms inclusive ("L+U") characterized by the general equation (B)

Mixture Molar Ratio=$(S+M)/(L+U)$     (B)

such that the molar ratio of the mixture is about 0.6 to about 3.8, and most preferably, between about 0.6 and about 2.4. With the mixture molar ratio (B) between about 0.6 and about 3.8, the mixture of structured triglycerides herein deliver less bioavailable energy than corn oil (i.e., less than about 9 kcal/g). With the mixture molar ratio (B) between about 0.6 and about 2.4, the mixture of structured lipid compositions herein deliver less bioavailable energy than corn oil (i.e., less than bout 9 kcal/g) and, when digested within the gastrointestinal tract of a mammal, they are absorbed and metabolized into a monomer effective to shift more energy content thereof to energy expenditure (i.e., "burn") and less to body fat storage (i.e., "store") than a similar amount of digested corn oil.

To deliver more significant reduction in caloric content, a structured lipid composition relatively high in saturated fatty acid content with a molar ratio "B" approaching about 0.6 would be preferred. This condition would also contribute a high level of solid fat content useful for specific food applications that require fat solids for functionality. On the other hand to deliver structured lipids that divert more excess absorbed caloric energy to heat versus body fat stores, a composition relatively high in unsaturated fatty acid content with a molar ratio "B" approaching about 2.4 would be preferred. This condition would also strongly favor a liquid oil suitable for a variety of food applications. A compositional continuum exists between these two specific formulations, and will deliver proportional levels of caloric reduction and energy diversion from body fat stores. Equally important is the fact that within this compositional continuum the specific functional requirements of the lipid can be concurrently balanced to achieve both optimal product performance and along with the specified nutritional benefits. By one approach, a particularly preferred mixture has a molar ratio B from 1.5 to about 1.9 to generally provide high levels of both desired effects.

The structured triglyceride mixtures of this invention may also contain other species outside formula (A). Preferred embodiments include mixtures that maximize or concentrate the prescribed product species using special synthetic techniques that manipulate the region-specific placement of chain acid moieties of varying chain length on the triacylglycerol backbone, the reactant ratios, and the reaction conditions. Purification techniques that reduce less desirable triglyceride species may also be employed, for example, to remove low molecular weight triglycerides that provide off flavors.

While the preferred compositions may include mixtures of structured triglycerides and other, non-structured fats falling within the desired molar ratios, it is also believed that a composition including only structured triglycerides may also be acceptable so long as the molar ratio B of the overall composition also falls within the range of about 0.6 to about 3.8, and preferably about 0.6 to about 2.4. Likewise, it is expected that that mixtures may include blends of structured triglycerides and other, non-structured fats that individually do not satisfy molar ratio B, but when combined provide an overall mixture that satisfies molar ratio B and also provides the desired effects described above.

In preferred structured triglycerides, the short moieties (S) are derived from acetic acid, propionic acid, butyric acid, or mixtures thereof. The medium moieties (M) are derived from caproic acid, caprylic acid, capric acid, lauric acid, or mixtures thereof. Long unsaturated moieties (U) are derived from palmitoleic acid, oleyl acid, vaccenic acid, linoleic acid, alpha-linolenic acid, gamma-linolenic acid, gadoleic acid, arachidonic acid, eicosapentaenoic acid, erucic acid, docosahexaenoic acid, or mixtures thereof. And, any long saturated triglyceride moieties (L) present in the mixture can be derived from stearic acid, lauric acid, behenic acid, arachidic acid, palmitic acid, or mixtures thereof.

Short or volatile acid residues have no more than 4 carbons. Short residues are derived from carboxylic acids of the formula $S_1COOH$, where $S_1$ is a short chain aliphatic group having 1 to 3 carbons. As denoted herein, where triglycerides are described as bearing pendant groups derived from acids having 2, 3, or 4 carbons, compositions derived from acids having predominantly 2, 3, or 4 carbons are included. Acylation of a glycerol hydroxyl by acid $S_1COOH$ results in the attachment of short chain S or $S_1$ to the glycerol backbone by means of an ester linkage (—O—(CO)—). Where there is more than one short group attached to a glyceride, the groups may be the same or different. As used herein, the term "acid residue" refers to an acyl group comprising a short chain, medium chain, or long chain portion, here S or $S_1$, and a carbonyl group.

Short chain acyl groups S may be straight or branched and may be derived from any synthetic or natural organic acid including, but not limited to, acetic (ethanoic), propionic (propanoic), butyric (butanoic), and the like acids. As used herein, chemical names include isomeric variations; for example, "butyric acid" includes normal-butyric acid (butanoic) and iso-butyric (2-methylpropanoic) acid, and so forth. Preferred acids are acetic acid, butyric acid, mixtures of acetic and butyric acids, mixtures of acetic and propionic acids, and mixtures of acetic, propionic, and butyric acids.

Medium chain acyl groups M are derived from any synthetic or natural organic medium chain fatty acid of the formula $M_1COOH$, including, but not limited to caproic (hexanoic), caprylic (octanoic), pelargonic (nonanoic), capric (decanoic), lauric (dodecanoic) and the like acids. Preferred medium chain fatty acids contain predominantly (i.e., at least about 75 percent), and preferably at least about 90 percent, caprylic acid, captric acid, or mixtures of these acids.

Unsaturated long chain U groups are also present in the mixtures. They may be monounsaturated or polyunsaturated. Unsaturated lipid oils comprising fatty acids and lipids incorporating fatty acid moieties are of particular interest and suitability for use in the present invention as a source of U groups. The fatty acid chains in these lipid oils can be straight, branched, or ring structures. Preferably, the fatty acid chains are straight hydrocarbon chains ("straight" embraces cis and/or trans main chain configurations). It is preferred that the fatty acids or lipids containing fatty acid moieties are amphipathic. Examples of suitable unsaturated lipids include many readily available vegetable, animal, and marine oils containing long chain fatty acids or moieties thereof. The invention is especially useful in the treatment of unsaturated triglyceride oils, polyunsaturated fatty acid oils, and other long chain unsaturated fatty acid oils. Again, lipid oils having straight alkyl chains in the fatty acid moieties are preferred.

The unsaturated long chain acyl groups U are derived from unsaturated acids of the formula $U_1COOH$, where $U_1$ is a C15 to C19 unsaturated group. These groups include, but are not limited to, palmitoleic (9-hexadecenoic), oleic (cis-9-octadecenoic), elaidic (trans-9-octadecenoic), vaccenic (trans-11-octadecenoic), linoleic (cis,cis-9,12-octadecedienoic), linolenic (9,12,15-octadecatrinoic and 6,9,12-octadecatrienoic), eleostearic (9,11,13-octadecatrienoic), arachidonic (5,8,11,14-eicosatetraenoic), and the like acids. Various U groups (and saturated long chain groups (L), if applicable) can be derived from mixtures of fatty acids obtained from natural oils such as soybean, safflower, sunflower, sesame, peanut, corn, olive, rice bran, mustard seed, cottonseed, poppyseed, rapeseed, marine, meadowfoam, and the like oils; fats such as babassu nut oil, palm oil, tallow, lard, shea butter, and the like; or plant waxes such as jojoba.

In order to manipulate the physical properties, (e.g., melting point, or dietary characteristics), of the finished lipid compositions, long chain saturated acyl L pendant groups also optionally may be included, assuming other lipid structure criteria as prescribed herein are satisfied. That is, for example, while the preferred triglyceride structure defined above does not include long chain saturated fatty acids on the glycerol moiety, the overall mixture may include other triglycerides having such fatty acids thereon. Such groups may be derived from fatty acids of the formula $L_1COOH$, where $L_1$ is a saturated aliphatic group having 15 to 39, preferably 15 to 21, carbons. Such L groups may be derived from any synthetic or natural, straight or branched saturated organic acids including, but not limited to, palmitic (hexadecanoic), stearic (octadecanoic), arachidic (eicosanoic), behenic (docosanoic), and the like acids. L groups may be derived from U groups hydrogenated before or after incorporation into triglycerides. Fully hydrogenated fats typically have an iodine value of 5 or less, and, in some cases, less than 2. Hydrogenated fats having at least about 70 percent, preferably at least about 75 percent, stearic acid residues such as, for example, hydrogenated peanut oil, hydrogenated olive oil, hydrogenated soybean oil, hydrogenated sesame oil, and hydrogenated corn oil are especially desirable. L moieties can be derived from hydrogenated fats having at least about 90 percent stearic acid residues, such as hydrogenated sunflower oil, hydrogenated safflower oil, and hydrogenated canola. Embodiments having L moieties exhibiting high behenic acid content are derived from hydrogenated rapeseed oil, hydrogenated fish oil, and hydrogenated meadowfoam oil. Other embodiments employ L moieties derived from a mixture of hydrogenated oils having pendant groups exhibiting greater chain length variety, such as, for example, L groups derived from a mixture of hydrogenated coconut, palm, or palm kernel oil and rapeseed oil, hydrogenated canola or soybean oil and rapeseed oil, and the like.

For example, the mixtures herein may also include about 30 to about 80 weight percent of triglycerides having (1) the R2 groups as a saturated long chain fatty acid residue having 14 to 24 carbon atoms inclusive (L); (2) one of the R1 or R3 groups as a medium chain fatty acid residue having 6 to 12 carbon atoms inclusive (M); and (3) the other of the R1 or R3 groups having a saturated long chain fatty acid residue with 14 to 24 carbon atoms inclusive (L). Such mixture preferably delivers about 4 to about 6 kcal/g of bioavailable energy.

S, M, U, and, if applicable, L groups may be derived from mixtures of acids, such as, for example, those derived from specific fractions of unhydrogenated, partially hydrogenated, or fully hydrogenated dairy butterfat, coconut, palm kernel, and the like oils and fats. Fat mixtures and/or fractions, crystallized fats, interesterified fats, and mixtures of these may also be employed. Starting materials for triglyceride preparations may be obtained commercially or isolated from natural sources. Alternatively, component triglycerides may be isolated from natural or processed fats or oils, or fractions thereof. If needed or desirable, mixtures can be purified using steam deodorization, filtration, fractional distillation, and similar purification methods.

Component triglycerides making up the low-calorie, reduced-fat lipid compositions of this invention can be, and preferably are, prepared using synthetic procedures. Also provided herein are methods for synthesizing such new lipids having desirable properties. This process is sometimes referred to as structuring lipids and the products are referred to as structured lipids or structured glycerol esters (SGE's).

Structured lipids are synthetic acylglycerols, preferably triacylglycerols, containing at least two different fatty acids esterified to the same glycerol moiety. Alternatively, the structured lipid is a phosphoglyceride having one or more fatty acids esterified to a hydroxyl group of the phosphoglyceride. Both chemical and enzymatic processes, namely direct esterification, acidolysis, and ester-ester interchange reactions can be used to synthesize or re-structure lipids as provided herein.

Within formula (A) set forth earlier, the mixtures described herein relates to novel compositions encompassing at least two groups of synthetic structured lipids, which for convenience sake here are referenced by their respective preparative procedure: group (I) lipid compositions comprising triacylglycerols bearing S, M, and/or U chain acid residues prepared stepwise with regiospecific enzyme-mediated synthesis; and group (II) lipid compositions prepared by single step, random interesterification synthesis comprising (i) triacylglycerol structures bearing S and U chain acid residues alone or in blends with triacylglycerols bearing M and L, or alternatively (ii) S, M, and U chain acid residues.

Structured Lipids Via Regiospecific Enzyme-Mediated Synthesis

With respect to group (I) lipid compositions, triacylglycerols bearing short (S), medium (M), and unsaturated (U) long chain acid residues are hydrolyzed by endogenous enzymes that release the constituent acids at rates inversely proportional to their relative size. Short chains are cleaved faster than medium chains which are in turn cleaved faster than long acid chains. Therefore, the natural digestive process in a mammal releases metabolizable energy from these structured triacylglycerols in stages, resulting in a sustained source of bioavailable energy over time. This attribute can be exploited in a variety of food product forms that offers new benefits to consumers.

The SMU structures are novel compositions that can be produced stepwise by regiospecific enzyme mediated synthesis, and optionally can be concentrated from synthetic mixtures using conventional oil processing and refining technology.

In one embodiment, an MMM (or SSS) triacylglycerol is first reacted with a UUU (or, alternatively, a LLL) triacylglycerol in the presence of a 1- and 3-specific enzyme, such as immobilized 1,3-specific lipase, to form an intermediate product containing USU (or UMU) triglyceride, respectively, and then further reacting the intermediate product with MMM (or SSS), whichever is different than the starting compound, in the presence of the 1- and 3-specific enzyme to form a USM (or UMS) triglyceride.

More specifically, the reactants may be pumped through a column packed bed reactor containing immobilized 1,3-specific lipase under relatively mild temperature conditions (e.g., about 55 to about 65° C.). After an initial pass, one of the 1,3-positions of the MMM is replaced with U, yielding UMM, and after a second pass through the reactor the remaining 1,3-position also will be substituted with U to yield the UMU intermediate. The UMU intermediate can be concentrated, and then can be passed together with SSS through another column packed bed reactor containing immobilized 1,3-specific lipase, to yield UMS; a triacylglycerol having short, medium, and unsaturated long chain acid moieties wherein the U moiety is at the 1-position or 3-position, but not the 2-position, of the triglyceride.

The resulting UMS (or USM) lipid compositions are reduced calorie, reduced fat compositions or blends. Generally, such lipid composition delivers less than 8 kcal/g, particularly less than 7.8 kcal/g, and more particularly less than 7.5 kcal/g, of bioavailable energy while containing substantial health-promoting unsaturated long chain fatty acid residues at the 1- or 3-positions. Compositions that contain the unsaturated long chain acid (U) in the 1- or 3-position are particularly desirable since they are less likely to be stored in adipose tissue and are more preferentially used for energy. When the U acyl moieties are disposed at the 1- or 3-positions of the glycerol moiety, they are not available for re-synthesis and fat storage. These structured lipids also contain at least one short-chain (S) and medium chain fatty acid (M) are useful for rapid absorption and energy release, as they release their constituent acids at rates inversely proportional to their relative size. The constituent synthetic triglycerides of the lipid compositions, when digested within the gastrointestinal tract of a mammal, are absorbed and metabolized in a manner effective to shift more energy content (kcal/g) to energy expenditure and less to body fat storage. The lipid composition also can be formulated essentially free of trans fatty acids. Therefore, a well-balanced dietary lipid composition is provided yielding sustained energy release and reduced or inhibited fat storage. The component fatty acids and their position in the triacylglycerol or glycerophospholipid molecule contribute in an optimal manner to the function and physical properties, metabolic fate, and putative health benefits of the structured lipid.

As indicated, these enzymatic reactions are catalyzed by lipases. Preferably, the lipase enzyme is immobilized to enable enzyme re-use and to facilitate continuous processes. Suitable support materials for lipase immobilization are widely available. Immobilized lipases can be commercially obtained from Novo Nordisk Biochem North America, Inc. (Franklinton, N.C.). The lipases are immobilized in ion exchange resins by adsorption. Moreover, lipases can be immobilized by adsorption, covalent attachment, or by crosslinking with suitable crosslinking agents such as described in U.S. Pat. No. 6,369,252. In addition, the lipases are preferably thermostable.

The specificity of lipases has been divided classically into major types: lipid class (e.g., simple, compound and derived lipids); positional (e.g., 1-position, 2-position, or 3-position); fatty acid (e.g., substrate specific; stereochemical); and combinations of these. Lipases from each of these categories may be used herein, including combinations derived from the same or different class.

Examples of suitable lipases include nonspecific lipases from *Pseudomonas cepacia, Candida antarctica, Aspergillus* sp., *Penicillium expansum*; sn-1,3 regiospecific lipases from *Rhizomucor miehei, Aspergillus arrhizus*; sn-2 regiospecific lipase from *Candida antarctica* A. Others include cis-9 unsaturated fatty acid specific lipase from *Geotrichum candidum* and short chain fatty acid specific lipase from *Penicillium roqueforti*. Examples of suitable phospholipases include phospholipase A1 and A2 from snake venom which are specific for the sn-1 and sn-2 positions of the glycerophospholipids, respectively.

Lipases can be used in several ways in the modification of triacylglycerols. In an aqueous medium, hydrolysis is the dominant reaction when a lipase is combined with an appropriate ester substrate. In an organic media, esterification and interesterification reactions are predominant. Moreover, when these enzymes are placed in an organic or mixed organic-aqueous environment, they exhibit novel characteristics such as altered chemoselectivity, altered stereoselectivity, enhanced stability, and increased rigidity. In preferred synthetic methods, where hydrolysis would not be advantageous, organic solvents are used.

In general, enzymatic reactions produce less by-products, especially fatty acid soaps, than chemical synthesis of structured lipids. Any by-products or undesired fractions can be removed by purification. Purification, if desired, can be by standard techniques after the enzymatic reaction. For example, thin layer chromatography (TLC), solvent evaporation, column or flash chromatography, preparative high-performance liquid chromatography (prep-HPLC), supercritical fluid chromatography (SFC), and short-path distillation techniques can be used. Free fatty acids can be removed by distillation or by other appropriate techniques.

In one embodiment, 1,3-specific lipases are used to provide structured lipid products which retain the starting fatty acid at the 2-position, especially when providing nutritional supplements. For example, 2-mono-acylglycerols produced by pancreatic lipase during digestion are the primary carriers of esterified fatty acids through the intestinal wall; these 2-monoglycerides, along with free fatty acids, are contained in micelles to facilitate such transport. Structured lipids containing fatty acids esterified at the 2-position are therefore generally well absorbed. Triacylglycerols containing an essential fatty acid (EFA) at the 2-position and short-chain or medium-chain fatty acids at the 1- or 3-positions, therefore, have the advantage of efficiently providing an EFA and a quick energy source.

The lipid mixture product of the regiospecific enzyme-mediated synthesis generally is a shelf-stable substantially liquid oil at ambient temperature conditions (e.g., about 24° C.), which can be readily incorporated and admixed into bulk foods. Although the rate of autoxidation and melting properties of triacylglycerols can be affected by the position of unsaturated fatty acids in the triacylglycerol molecule under specific circumstances, the triacylglycerols of the present invention having unsaturated fatty acids at the 1- or 3-positions of glycerol have been observed to be sufficiently stable toward oxidation to provide viable shelf-stable edible lipid-containing products.

In one specific embodiment, at least 50 weight percent, particularly at least 70 weight percent, and more particularly at least 90 weight percent, of the lipid composition prepared via enzyme-mediated synthesis comprises triglycerides in which: (1) the R2 group is selected from the group consisting of a short chain fatty acid residue having 2 to 4 carbon atoms inclusive (S) and a medium chain fatty acid residue having 6 to 12 carbon atoms inclusive (M); (2) one of the R1 or R3 groups is an unsaturated long chain fatty acid residue having 14 to 24 carbon atoms inclusive (U); and (3) the other of the R1 or R3 group is different from R2 and is selected from the group consisting of short chain fatty acid residues having 2 to 4 carbon atoms inclusive (S) and medium chain fatty acid residues having 6 to 12 carbon atoms inclusive (M).

In a specific method for forming the above mixtures of structured lipids via enzyme-mediated synthesis, the following reactants are combined (i) a first synthetic triglyceride selected from the group consisting SSS, MMM, and mixtures thereof, wherein each S group is, independently, a short chain fatty acid residue having 2 to 4 carbon atoms inclusive, and each M group is, independently, a medium chain fatty acid residue having 6 to 12 carbon atoms inclusive, (ii) a second synthetic triglyceride selected from the group consisting of UUU, LLL, and mixtures thereof, wherein each L group is, independently, a saturated long chain fatty acid residue having 14 to 24 carbon atoms inclusive, and each U group is, independently, an unsaturated long chain fatty acid residue having 14 to 24 carbon atoms inclusive, (iii) a 1,3-specific lipase, and (iv) an acid or C2-C4 alcohol acid ester, under conditions which allow formation of a third synthetic triglyceride having the formula (C):

(C)

wherein $R_y$ is a S group or a M group as defined above, and $R_x$ and $R_z$ are fatty acid residues wherein at least one of $R_x$ and $R_z$ is a U group and/or a L group as defined above.

In a further embodiment, the third synthetic triglycerides, as defined above, may be further included in the lipid composition containing (b) synthetic triglycerides SSS and/or MMM as defined above, (c) a 1,3-specific lipase, and (d) an acid or $C_2$-$C_4$ alcohol acid ester, are combined under conditions which allow formation of a fourth synthetic triglyceride having the formula:

wherein $R_t$ is a S or M group as defined above, and one of groups $R_s$, and $R_u$ is a U or L group as defined above and the other group is a M or S group as defined above and is different from $R_t$. The lipase and ester used may be the same as, or different from the lipase and ester used to prepare the third synthetic triglyceride. This embodiment allows for the inclusion of triglycerides containing saturated long chain acid residues (L) at some 1,3-positions of the glycerol moiety to the extent U content is maintained as prescribed herein (i.e., at least about 30 weight percent of the 1,3-positions of the triacylglycerols are unsaturated long chain fatty acid residues ("U") having between 14 to 24 carbon atoms. The inclusion of minor amounts of L groups may be useful in certain applications to modify the physical or dietary features of the resulting lipid blend.

Structured Glycerol Esters (SGE's) Via Random Interesterification

Other lipid compositions comprise triacylglycerol structures bearing S or M in combination with U chain acid residues alone or in blends with triacylglycerols bearing M and L, or S, M, and U chain acid residues. Such triglyceride mixtures can also be prepared by single step, random interesterification synthesis.

Single step, randomizing, synthesis of triacylglycerols from fatty acid esters and short (or medium) chain triglycerides can be used to provide novel neutral oils that can deliver health promoting fatty acids (e.g., conjugated linoleic acids, omega 3-fatty acids, monounsaturated acids, and the like) and also stimulate mobilization and metabolism of fat stored in adipose tissue. The compositions of these novel oils can range from predominantly USS forms to mixtures of USS, SUS, UUS, and USU forms. Preferred embodiments (after removal of unwanted volatile fractions) have about 50 to about 100 percent (most preferably about 65 to 70 percent) USS triacylglycerol structures, and deliver about 7 to about 8 kcal/g of bioavailable energy. Also highly desirable blended compositions may be provided that contain USS in combination with LLM structures. That is, the U group occupies a 1- or 3-position in the di-short triglyceride, thereby providing an unsaturated long chain glyceride group that (when hydrolyzed and absorbed) is not readily available for resynthesis and fat storage. These USS structures deliver about 7 to about 8 kcal/g of bioavailable energy, permit delivery of desired health promoting fatty acids, and enable broad functional application in foods. With the inclusion of LLM structures in the mixture, with 4 to 5 kcal/g of caloric bioavailable energy, the simultaneous delivery of desired unsaturated and polyunsaturated fatty acids, and the control of total dietary calories from fat is made possible. In an alternative embodiment, novel SMU structures may be derived from random interesterification and isolation techniques. The exploitation of single-step, simple chemistry offers reduced manufacturing costs in comparison to multi-step techniques, as well as lower capital investment and final ingredient costs.

Desirable triglyceride mixtures enriched with the above triglycerides are prepared using a random interesterification of short chain triglycerides (or triglycerides enriched with short chain moieties) and medium chain triglycerides (or triglycerides enriched with medium chain moieties) with long chain triglycerides, preferably triglycerides enriched with hydrogenated long chain residues, using reactants in predetermined molar ratios that maximize the production of triglycerides bearing the desired content of short, medium, and long moieties. A strong base, such as sodium methoxide, is preferably used as a chemical catalyst for the reaction. Purification ordinarily follows to obtain a mixture with the desired amounts of synthetic triglycerides. Preferred purification methods can be selected to maximize the isolation of desired triglyceride species. For example, if di-short species (e.g., SSU and SUS) are desired, the crude product can be washed with water and the aqueous phase removed, followed by heating at about 100° C. to remove residual water. Steam deodorization may be used advantageously to recover excess short chain triglycerides leaving the desired di-short species. In an alternative embodiment in which SMU/SUM/MSU species are desired, steam deodorization may also be used to remove SSS, SSM, SMS, MMS, MSM, and MMM species formed in the reaction. Mixtures even more enriched with SMU/SUM/MSU species can be obtained by molecular distillation of the steam deodorized product. Using such techniques, mixtures containing over about 75 percent, and even over 90 percent, SMU/SUM/MSU species can be obtained.

In one example, a typical random interesterification reaction mixture used to produce di-short unsaturated triglycerides contains about 1 to about 25 moles short triglycerides and about 0.5 to about 10 moles nonhydrogenated oil, and particularly contains about 5 to about 15 moles short triglycerides and about 5 moles unsaturated long chain acid-bearing triglycerides.

In another example, typical interesterification reaction mixture used to produce triglycerides bearing short (S), medium (M), and unsaturated long chain (U) acid residues contains about 1 to about 15 moles short triglycerides, about 1 to about 10 moles medium triglycerides and about 0.5 to about 5 moles nonhydrogenated oil, and particularly contains about 5 to about 10 moles short triglycerides, about 2 to about 7 moles medium triglycerides, and about 0.7 to about 2 moles unsaturated long chain acid-bearing triglycerides.

In one specific embodiment, a lipid composition is prepared via random interesterification wherein at least about 80 weight percent of the mixture comprises triglycerides in which: (1) the R2 group is a short chain (S) fatty acid residue having 2 to 4 carbon atoms inclusive, (2) one of the R1 and R3 groups is an unsaturated long chain (U) fatty acid residue having 14 to 24 carbon atoms inclusive, and the other group is a short chain (S) fatty acid residue having 2 to 4 carbon atoms inclusive (i.e., SSU or USS). Such lipid mixture delivers about 7 to about 8 kcal/g of bioavailable energy. In another specific embodiment, the lipid composition including the di-short species further contains about 30 to about 80 weight percent triglycerides in which: (1) the R2 group is a saturated long chain fatty acid residue (L) having 14 to 24 carbon atoms inclusive, (2) one of the R1 or R3 groups is a medium chain (M) fatty acid residue having 6 to 12 carbon atoms inclusive, and (3) the other of the R1 or R3 group is a saturated long chain (L) fatty acid residue having 14 to 24 carbon atoms inclusive. The resulting lipid composition delivers about 4 to about 6 kcal/g of bioavailable energy.

An advantage of the mixtures described herein is that, because of the unique properties of triglyceride mixtures enriched with the di-short (SSU/SUS) or the SMU/SUM/MSU species, they can be used alone or mixed with hard-stocks or liquid oils to obtain low calorie, low trans blends having suitable properties for a variety of food products.

The low calorie triglycerides mixtures described herein are incorporated either alone, or in combination with one or more other fats or fat mimetics, into any food composition in amounts effective to provide sufficient plasticity to the fat component and/or in amounts effective to provide a significant caloric reduction of the calories due to fat. For example, about 10 percent or greater replacement would be effective for this purpose, and replacements of at least about 25 percent, preferably at least about 30 percent, and more particularly about 50 to about 100 percent, are desired in many cases.

Exemplary food products which can be improved by replacing at least a portion of the usual fat component with the low calorie triglycerides of this invention include, but are not limited to, energy bars, ready-to-eat cereals, baked foods, such as cookies, crackers, biscuits, cakes, and the like which all contain at least a flour or starch component in addition to the low calorie triglycerides of this invention; snack products which are fried or coated with fat or oil and/or also contain at least a flour or starch component in addition to the low calorie triglycerides; emulsion products, such as margarine products (e.g., full-fat, low-fat, and fat substitute products), salad dressing and mayonnaise containing emulsions having a fat phase including the low calorie triglycerides and an aqueous phase; candies and confections which contain a sweetener such as sugar, aspartame, or other artificial sweetener in addition to the low-calorie triglycerides and a flavor such as chocolate; and dairy product substitutes which contain a dairy protein such as whey, casein, caseinate, or the like in addition to the low calorie triglycerides. The margarine products also typically contain a milk component and butter flavor, while the salad dressings will contain spices, mayonnaise, and egg. Among the baked products, cakes, and cookies also contain sweeteners and the crackers typically contain salt. They also can be used as reduced calorie or low calorie fats, for modifying and improving the melting properties of fats, and as an edible substitute for natural fats. The structured lipids and mixtures comprising structured lipids can also be used for a variety of physiological applications.

The following examples are included to illustrate the invention and not to limit it. Unless otherwise stated, all parts and percentages are by weight. All patents, publications, and references disclosed herein are hereby incorporated by reference.

EXAMPLES

Example 1

Lipase-Catalyzed Synthesis of Structured Glycerol Esters (SGE's)

This example illustrates an investigation of the preparation of triglyceride mixtures bearing different combinations of short, medium, unsaturated long, and/or saturated long chain acid substituents via manipulations of lipase-catalyzed synthesis and reactants.

Structured glycerol esters (SGE's) having aliphatic fatty acid residues at specific glycerol positions were synthesized using 1,3-specific enzyme catalysts and a packed-bed reactor. The products were characterized by high performance liquid chromatography (HPLC).

Methods and Materials. Polymer-bound lipase (*Mucor miehei*; IM-60), was obtained from Novo Industrie. The packed-bed reactor (PBR) consisted of a 6.2 g of IM-60 in a 32×1.2 cm jacked glass column connected to a Neslab RTE-110 thermo regulated bath maintained at 60° C. An Ismatec peristaltic pump fed reactants through the PBR at 1.0 mL/min for an average exposure time of about 40 to about 43 minutes per pass of the PBR.

Results: 1-stearoyl-2,3-di(butyroyl)glycerol. Exposure of a 9:1 molar ratio of ethyl stearate (containing a minor amount of ethyl palmitate) and tributyrin in hexane to the IM-60 catalyst in the packed-bed reactor (flowrate at 1 mL/min) at 60° C. produced a quantitative yield of mono-long chain product: 1-stearoyl-2,3-di(butyroyl)glycerol and a minor amount of 1-palmitoyl-2,3-di(butyroyl)glycerol according to HPLC analysis.

1,3-di(stearoyl)-2-butyroylglycerol. Longer exposure of the same solution (i.e., two or more passes through the PBR) of reactants to the IM-60 catalyst in the PBR (flowrate at 1 mL/min) at 60° C. produced about 88 percent 1,3-di(stearoyl)-2butyroylglycerol, about 8 percent 1-stearoyl-2,3-di(butyroyl)glycerol, and about 4 percent tristearin.

1-stearoyl-3-oleoyl-2-butyroylglycerol. A solution of hexane containing a 3:1 molar ratio of oleic acid and 1,3-di(stearoyl)-2-butyroylglycerol was cycled through the IM-60 catalyst in the PBR (flowrate at 1 mL/min) at 60° C. HPLC analysis showed the major product to be 1-stearoyl-3-oleoyl-2-butyrylglycerol (40 percent). Minor products were detected including: 1,3-di(oleoyl)-2-butyroyl-glycerol (12 percent), 1,3-di(stearoyl)-2-butyroylglycerol (16 percent), 1,3-di(oleoyl)-2-stearoylglycerol (18 percent), and triolein (14 percent).

These experimental test results demonstrated that regiospecific placement of acid chains on tricylglycerols could be obtained via appropriate manipulations of lipase catalyzed synthesis and reactants.

Example 2

Enzyme-Catalyzed Synthesis of SMU Structured Lipids

This example illustrates the preparation of triglyceride mixtures bearing short, medium, and unsaturated long chain acid substituents via lipase-catalyzed synthesis.

Tricaprylin (8.0 g, 14.4 mmole), oleic acid (45.8 g, 162 mmole) and 130 mL hexane were mixed and pumped twice through a column packed bed reactor that contained Novo IM-60 (*Mucor Miehei*), an immobilized, 1,3-specific lipase.

The reactor was maintained at 60° C. and the average flowrate was 1 mL/min. The final column effluent was concentrated on a vacuum rotary evaporator (to remove hexane) and was passed through a falling film still (to remove unreacted oleic acid). The crude product (15.7 g) was made up of about 14.8 percent OCC, about 76.1 percent OCO, and about 9.0 percent OOO (where "O" is the acyl group derived from oleic acid and "C" is the acyl group derived from caprylic acid). The crude product was combined with 6.2 g (60.8 mmole) methyl butyrate and about 55 mL hexane. About one-half of the final about 75 mL solution was passed twice through the packed bed reactor (60° C. at 1 mL/min) resulting in conversion to about 60.5 percent BCO-glycerol (butyryl-1-caprylyl-oleyl glycerol). Mass spectral analysis showed that the major component in this composition had the molecular weight (580 g/mole) expected for the BCO triacylglycerol.

Example 3

Animal Feeding Studies on Caloric Availability of Oils, Including SSU

Animal feeding studies were conducted to evaluate the digestion and absorption of various types of edible oils, including test oils representative of the triglyceride mixtures discussed herein. Weenling rats were used as the test subjects. Six mixtures of safflower oil (1.0 mole) and tripropionin or tributyrin (2.5, 4, or 12 moles) were interesterified. The six compositions were prepared with the following reactant amounts indicated in Table 1.

TABLE 1

| Test Oil Composition | Safflower Oil (mol) | Tripropionin (mol) | Tributyrin (mol) |
|---|---|---|---|
| 1 | 1 | 2.5 | 0 |
| 2 | 1 | 4 | 0 |
| 3 | 1 | 12 | 0 |
| 4 | 1 | 0 | 2.5 |
| 5 | 1 | 0 | 4 |
| 6 | 1 | 0 | 12 |

The final compositions of the test oils produced from the reactants in Table 1 are listed below in Tables 2 and 3.

TABLE 2

Composition of test oils and specified constituent ratios

| | Oil Diet Designation | | | | | |
|---|---|---|---|---|---|---|
| | 1 | 2 | 3 | 4 | 5 | 6 |
| Constituent Acid | | | | | | |
| SCA (%) | 24.3 | 27.4 | 31.8 | 21.0 | 23.4 | 27.4 |
| MCA (%) | 0 | 0 | 0 | 0 | 0 | 0 |
| LCA (%) | 7.3 | 7.0 | 6.6 | 7.6 | 7.4 | 7.0 |
| UCA (%) | 68.4 | 65.6 | 61.6 | 71.4 | 69.2 | 65.6 |
| Total | 100.0 | 100.0 | 100.0 | 100.0 | 100.0 | 100.0 |
| Constituent Molar Ratios | | | | | | |
| (S + M)/(U + L) | 0.92 | 1.14 | 1.50 | 1.17 | 1.34 | 2.01 |

TABLE 3

Triacylglycerol Profile

| Weight Percent | Oil Diet Designation | | | | | |
|---|---|---|---|---|---|---|
| TAG | 1 | 2 | 3 | 4 | 5 | 6 |
| SSU | 52.8 | 63.6 | 79.9 | 52.8 | 63.6 | 79.9 |
| SSL | 5.7 | 6.9 | 8.6 | 5.7 | 6.9 | 8.6 |
| SUU | 28.7 | 21.5 | 9.0 | 28.7 | 21.5 | 9.0 |
| SUL | 6.2 | 4.7 | 2.0 | 6.2 | 4.7 | 2.0 |
| SLL | 0.3 | 0.3 | 0.1 | 0.3 | 0 | 0 |
| UUU | 4.6 | 2.2 | 0.3 | 4.6 | 2.2 | 0.3 |
| LUU | 1.5 | 0.7 | 0.1 | 1.5 | 0.7 | 0.1 |
| LLU | 0.2 | 0.1 | 0.0 | 0.2 | 0.1 | 0.0 |
| LLL | 0 | 0 | 0 | 0 | 0 | 0 |
| Totals | 100.0 | 100.0 | 100.0 | 100.0 | 100.0 | 100.0 |
| (S + M)/(U + L) | 0.92 | 1.14 | 1.50 | 1.17 | 1.34 | 2.01 |

For each test oil, a mixture of fatty acid constituents, as defined in Table 1, was randomly interesterfied in the presence of a catalytic amount of sodium methoxide (about 0.3 percent) with vigorous stirring at 125° C. for 20 minutes. The ratio of reactants determined the final compositions. After cooling the reaction mixture to about 30° C. and adding about 5 weight percent water, the aqueous phase was removed. The crude product was stirred under vacuum at 100° C. with about 0.5 percent bleaching clay (Tonsil Optimum FF) and 1000 ppm citric acid (dissolved in water) for about 0.5 to 1 hour to decolorize and remove soaps. The bleached product was filtered, and the filtrate was vacuum steam deodorized to remove unreacted short chain triglycerides. The refined oils were randomized structures that remained fully liquid at normal ambient temperature. The final mole ratio of short chain acids to long chain acids was determined using high resolution NMR, and this single measure defines the final composition profile for a random reaction.

Figure 1:
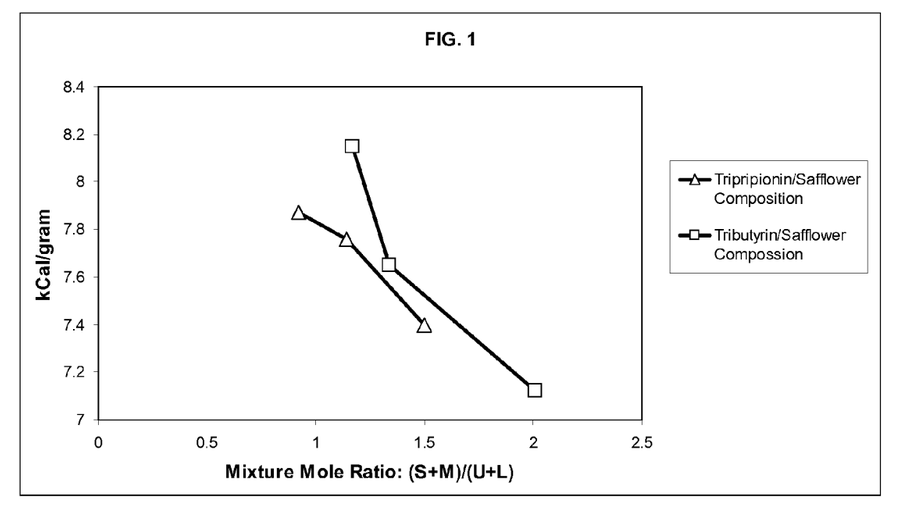
FIG. 1 is a plot of calories versus composition for the test oils of Example 3.

Portions of the six compositions produced above were used as Test Materials, and were fed (at 10 weight percent of total diet) to weenling rats over a period of 14 days. A Control group received corn oil at 10 weight percent of the diet in place of the Test Materials. Animal weight gain at the end of the feeding period was used to estimate the caloric availability of the Test Materials using published methodology (Finley et al., "Growth Method for Estimating the Caloric Availability of Fats and Oils," *J. Agric. Food Chem.*, 1994, 42, 489-494). All Test Materials delivered fewer calories than the corn oil Control, the values ranging from 8.15 to 7.12 kcal/g; for comparison purposes, corn oil generally delivers about 9 kcal/g. A plot of the data showed that caloric reduction was maximized for compositions produced from the highest short chain/unsaturated reactant ratios. In these compositions, the level of USS+SUS structures (i.e., mono-long chain structures) is at least 41 percent and can be as high as 99+ percent. A plot of the data (kcal/g versus Composition) is set forth in FIG. 1.

Example 4

Animal Feeding Studies to Determine Caloric Availability of SMU-Containing Oils

A second animal feeding study was conducted to evaluate the digestion and absorption of various types of edible oils, including test oils representative of the present invention. Weenling rats were used as the test subjects using essentially the same protocol as used in Example 3. The purpose of this study was to employ an established growth method to estimate the caloric availability of several test oils and to further validate the use of this method with the Lunar DPX-IQ dual-energy X-ray absorptiometric estimation of body composition in rodents. P. S. MacLean, J. A. Higgins, G. C. Johnson, B. K. Fleming-Elder, J. C. Peters, J. O. Hill, "Metabolic adjustments with the development, treatment, and recurrence of obesity in obesity-prone rats," *Am. J. Physiol. Regul. Integr. Comp. Physiol.*, 287(2):R288-97, 2004. The established growth model is described by Finley et al., "Growth Method for Estimating the Caloric Availability of Fats and Oils," *J. Agric. Food Chem.*, 1994, 42, 489-494.

Test Oils and Preparation of the Diets. The control diet used for the baseline period and throughout the study for AL rats was similar to the standard AIN93G diet (Finley et al.) but with a minimal amount of fat sufficient only to provide essential fatty acids. The test diet was the same as the 50 percent CR diet with an addition of corn oil or one of four test oils that represented about 18 percent of total calories in the AL diet. The corn oil was obtained from a standard source. Four test oils comprising structured glycerol esters were prepared that were composed of specified mixtures of tri-glyceride compounds with specified amounts of short chain, medium chain, long chain saturated, and unsaturated fatty acids.

The test oils were prepared by random interesterification of mixtures of triglycerides catalyzed by sodium methoxide as a strong base. For each test oil, a mixture of fatty acid constituents provided by tripropionin, tributyrin, a commercially available medium chain triglyceride (Neobee M5, Stepan Company, Northfield, Ill.), tristearin, high oleic canola oil as set forth in Table 3. The reactants were randomly interesterified in the presence of a catalytic amount of sodium methoxide (about 0.3 percent) with vigorous stirring at about 150° C. for about 4-5 hours to ensure completion. (Neobee M5 generally contains about 67 percent medium chain triglycerides having 8 carbon atoms and about 33 percent medium chain tryglycerides having 10 carbon atoms.) The mixtures were cooled to about 95° C. and were quenched with water. Bleaching clay was added and vacuum and heat were applied to dry the products. Vacuum filtration provided the crude products. Each of the crude oils was vacuum steam deodorized to remove excess volatile triacylglycerols containing short and medium chain acid residues. The final yields are listed in Table 4.

TABLE 4

Triglyceride Reactant Weights and Product Yields

| Reactant | Sample 1, grams | Sample 3, grams | Sample 5, grams | Sample 7, grams |
| --- | --- | --- | --- | --- |
| Triacetin | 988.5 | 984.9 | 366.9 | 169.8 |
| Tripropionin | 117.9 | 117.5 | 43.8 | 20.2 |
| Neobee M5 | 440.3 | 438.7 | 214.9 | 145.5 |
| Stearine 17 | 0.0 | 529.7 | 286.5 | 0.0 |
| High Oleic Canola Oil | 659.8 | 131.5 | 425.0 | 1105.0 |
| Total | 2206.5 | 2202.3 | 1337.1 | 1440.5 |
| Yield | 1205.4 | 1201.3 | 1032.0 | 1237.7 |
| % Yield | 54.6% | 54.5% | 77.2% | 85.9% |
| Physical State | liquid | solid | solid | solid |

The designation of the respective type of diet applicable to a given test oil sample, the relative proportions of constituent fatty acids thereof, and certain ratios of chain acids of different length, are indicated in Table 5. In Table 5, the following abbreviations are used: SCA (or S)=short chain acids (C2, C3, C4); MCA (or M)=medium chain acids (C8, C10, C12); LCA (or L)=long chain saturated acids (C14, C16, C18, C20, C22, C24); UFA (or U)=unsaturated fatty acids (C16:1, C18:1, C18:2, C18:3, all about 100 percent cis).

TABLE 5

Composition of Test Oils and Specified Constituent Ratios

| | Oil Diet Designation | | | |
| --- | --- | --- | --- | --- |
| Constituent Acid | 1 | 3 | 5 | 7 |
| SCA (%) | 19.8 | 29.6 | 21.9 | 8.5 |
| MCA (%) | 29.4 | 26.8 | 16.6 | 10.2 |
| LCA (%) | 3.8 | 35.7 | 27.5 | 6.0 |
| UCA (%) | 47.0 | 8.0 | 34.1 | 75.3 |
| Total | 100.0 | 100 | 100 | 100 |
| Constituent Molar Ratios | | | | |
| (S)/(M + U + L) | 0.68 | 1.15 | 0.85 | 0.30 |
| (U)/(U + L) | 0.93 | 0.18 | 0.55 | 0.92 |
| (S + M)/(U + L) | 2.4 | 3.8 | 1.7 | 0.6 |

The percentages of MCA, LSA, and UFA were determined by high temperature capillary gas chromatography; the percentage of SCA was calculated by difference since the short chain acids are too volatile to be assayed by gas chromatography. The (S)/(M+U+L) molar ratio was also determined by high resolution proton NMR.

Each test oil sample was also analyzed using high temperature GC to determine the profile of intact triacylglycerols. The results are shown below in Table 6.

TABLE 6

High Temperature GC Triacylglycerol Profile

| Weight Percent TAG | Sample 1 | Sample 3 | Sample 5 | Sample 7 |
| --- | --- | --- | --- | --- |
| SSS | 0 | 7.6 | 0 | 0 |
| SSM | 9.3 | 17.1 | 10.8 | 0 |
| SMM | 7.8 | 9.7 | 6.8 | 0 |
| SSU | 13.7 | 8 | 19.8 | 4.9 |
| SSL | 6.7 | 12.1 | 14 | 0.9 |
| MMM | 0 | 0 | 0 | 0 |
| SMU | 5.2 | 4.1 | 6.5 | 10.3 |
| SML | 3.1 | 13.9 | 6 | 0 |
| MMU | 0.4 | 0 | 0.8 | 3.0 |
| SUU | 32.4 | 0.9 | 1.3 | 0 |
| MML | 0.2 | 0 | 0.7 | 0 |
| SUL | 3.6 | 2.4 | 8.6 | 7.0 |
| SLL | 0 | 5.4 | 6.1 | 2.8 |
| MUU | 2.7 | 0.1 | 0.4 | 1.1 |
| MLL | 0 | 0.3 | 1.5 | 0.0 |
| MUL | 0 | 0 | 0.8 | 0.40 |
| UUU | 11.7 | 0.9 | 5.3 | 54. |
| LUU | 1.9 | 7.5 | 3.8 | 9.2 |
| LLU | 0.7 | 9.2 | 6.6 | 3.9 |
| LLL | 0 | 0.4 | 0.7 | 1.4 |
| Totals | 99.9 | 100.1 | 100.5 | 99.9 |

The actual compositions of all the diets fed (samples 1, 3, 5, 7, corn oil control, AL, and 50 percent CR) to the test animals are shown in Tables 7 and 8. It is important to note that with the removal or replacement of carbohydrate/fat calories, the caloric density of the diet changed. The diets were specifically designed so that the amount of food could be adjusted such that each group received exactly the same daily intake of vitamins, minerals, and protein.

The only difference between the groups was in the removal or addition of calories as carbohydrate and the specified fat. The hypothesis of this growth model is that the oils will exhibit different caloric availability values which represent their differential absorption, metabolism, and/or deposition, providing the impetus to pursue a specific oil composition as a key component in food products in order to prevent unwanted weight gain (as fat mass).

TABLE 7

Composition of Animal Diets

| | AL | | 50% CR | | Corn Oil Control | | Sample 1 | |
|---|---|---|---|---|---|---|---|---|
| | gm (%) | kcal (%) | gm (%) | kcal (%) | gm (%) | kcal (%) | gm (%) | kcal (%) |
| Protein | 19.1 | 20.3 | 35.9 | 40.7 | 31.5 | 29.9 | 31.5 | 29.9 |
| Carbohydrate | 71.1 | 75.7 | 46.5 | 51.5 | 39.8 | 37.8 | 39.8 | 37.8 |
| Fat | 1.6 | 3.9 | 3.1 | 7.9 | 15.1 | 32.3 | 15.1 | 32.3 |
| Energy (kcal/gm) | 3.7 | | 3.5 | | 4.2 | | 4.2 | |

| Ingredient | gm | kcal | gm | kcal | gm | kcal | gm | kcal |
|---|---|---|---|---|---|---|---|---|
| Casein | 200 | 800 | 200 | 800 | 200 | 800 | 200 | 800 |
| L-Cystine | 2 | 12 | 3 | 12 | 3 | 12 | 3 | 12 |
| Corn Starch | 515 | 2060 | 15 | 60 | 15 | 60 | 15 | 60 |
| Maltodextrin | 132 | 520 | 132 | 528 | 132 | 528 | 132 | 528 |
| Sucrose | 100 | 400 | 100 | 400 | 100 | 400 | 100 | 400 |
| Cellulose | 50 | 0 | 50 | 0 | 50 | 0 | 50 | 0 |
| Soybean Oil | 17.5 | 157.5 | 17.5 | 157.5 | 17.5 | 157.5 | 17.5 | 157.5 |
| Coil Oil | 0 | 0 | 0 | 0 | 80 | 720 | 0 | 0 |
| Low LC | 0 | 0 | 0 | 0 | 0 | 0 | 80 | 720 |
| Low UF | 0 | 0 | 0 | 0 | 0 | 0 | 0 | 0 |
| High UF-LC | 0 | 0 | 0 | 0 | 0 | 0 | 0 | 0 |
| High UF | 0 | 0 | 0 | 0 | 0 | 0 | 0 | 0 |
| t-Butyl Hydroquinone | 0.0035 | 0 | 0.0035 | 0 | 0.0035 | 0 | 0.0035 | 0 |
| Minerals | 35 | 0 | 35 | 0 | 25 | 0 | 35 | 0 |
| Vitamins | 10 | 40 | 10 | 40 | 10 | 40 | 10 | 40 |
| Choline Bitartrate | 2.5 | 0 | 2.5 | 0 | 2.5 | 0 | 2.5 | 0 |
| Colorant | 0.05 | 0 | 0.05 | 0 | 0.05 | 0 | 0.05 | 0 |
| Total | 1065.1 | 3998 | 565.1 | 1998 | 645.1 | 2718 | 645.1 | 2718 |

TABLE 8

Composition of Animal Diets

| | Sample 3 | | Sample 5 | | Sample 7 | |
|---|---|---|---|---|---|---|
| | gm (%) | kcal (%) | gm (%) | kcal (%) | gm (%) | kcal (%) |
| Protein | 3.15 | 29.9 | 31.5 | 29.9 | 31.5 | 29.9 |
| Carbohydrate | 39.8 | 37.8 | 39.8 | 37.8 | 39.8 | 37.8 |
| Fat | 15.1 | 32.3 | 15.1 | 32.3 | 15.1 | 32.3 |
| Energy (kcal/gm) | 4.2 | | 4.2 | | 4.2 | |

| Ingredient | gm | kcal | gm | kcal | gm | kcal |
|---|---|---|---|---|---|---|
| Casein | 200 | 800 | 200 | 800 | 200 | 800 |
| L-Cystine | 3 | 12 | 3 | 12 | 3 | 12 |
| Corn Starch | 15 | 60 | 15 | 80 | 15 | 60 |
| Maltodextrin | 132 | 528 | 132 | 528 | 132 | 528 |
| Sucrose | 100 | 400 | 100 | 400 | 100 | 400 |
| Cellulose | 50 | 0 | 50 | 0 | 50 | 0 |
| Soybean Oil | 17.5 | 157.5 | 17.5 | 157.5 | 17.5 | 157.5 |
| Coil Oil | 0 | 0 | 0 | 0 | 0 | 0 |
| Low LC | 0 | 0 | 0 | 0 | 0 | 0 |
| Low UF | 80 | 720 | 0 | 0 | 0 | 0 |
| High UF-LC | 0 | 0 | 80 | 720 | 0 | 0 |
| High UF | 0 | 0 | 0 | 0 | 80 | 720 |
| t-Butyl Hydroquinone | 0.0035 | 0 | 0.0035 | 0 | 0.0035 | 0 |
| Minerals | 35 | 0 | 35 | 0 | 25 | 0 |
| Vitamins | 10 | 40 | 10 | 40 | 10 | 40 |
| Choline Bitartrate | 2.5 | 0 | 2.5 | 0 | 2.5 | 0 |
| Colorant | 0.05 | 0 | 0.05 | 0 | 0.05 | 0 |
| Total | 645.1 | 2718 | 645.1 | 2718 | 645.1 | 2718 |

Body Weights and the Rate of Weight Gain. Weight gain was analyzed from day 3 to day 14 and calculated regression equation for each. The body weights were taken throughout the feed period. Growth curves under these acute feeding regimens turned out to be essentially linear. Assuming that the growth rate for each group is a function of the availability of fat, available caloric value was estimated for each supplemented fat using regression equations and corn oil as the known standard. The available caloric value for each test oil and calculated regression equations are summarized below in Table 9 below. All test oils showed a reduction of bioavailable energy relative to the corn oil control (i.e., less than about 9 kcal/g).

TABLE 9

Weight Gain and Bioavailable Energy

| | Linear Regression | Correlation Coefficient | Weight at Day-3 | Weight at Day 14 | Weight Gain | kcal/g |
|---|---|---|---|---|---|---|
| Corn Oil | wt = 4.7864 * D + 185.33 | 0.9985 | 199.7 | 252.4 | 29.8 | 9 |
| Sample 1 | wt = 4.6624 * D + 187.77 | 0.9973 | 201.8 | 253.0 | 28.4 | 8.58 |
| Sample 3 | wt = 4.0412 * D + 191.31 | 0.9975 | 203.4 | 247.9 | 21.7 | 6.55 |
| Sample 5 | wt = 4.2442 * D + 190.49 | 0.9984 | 203.2 | 249.9 | 23.9 | 7.22 |
| Sample 7 | wt = 4.7207 * D + 189.06 | 0.9983 | 203.2 | 255.1 | 29.1 | 8.79 |

The bioavailability of each test oil was calculated from the regression equation of the weight gain, using corn oil as the standard. In this calculation, the caloric availability is a direct function of the weight gain. A ratio of weight gain (Test Oil/Corn Oil) was multiplied by the standard's known availability (9 kcal/g), to derive the bio-availability of each oil.

Body Composition. A number of body composition end points were measured at the conclusion of the animal feeding study. One such measure was body fat content. Body composition was assessed by dual energy X-ray absorptiometry to determine fat free mass ("FFM," i.e., bone and lean body mass) or fat mass ("FM") as described in P. S. MacLean, J. A. Higgins, G. C. Johnson, B. K. Fleming-Elder, J. C. Peters, J. O. Hill, "Metabolic adjustments with the development, treatment, and recurrence of obesity in obesity-prone rats," *Am. J. Physiol. Regul. Integr. Comp. Physiol.*, 287(2):R288-97, 2004, and is summarized in Table 10 below:

TABLE 10

Percent Body Fat

| Description | Percent Body Fat |
|---|---|
| Corn Oil | 7.22% |
| Sample 1 | 6.07% |
| Sample 3 | 7.62% |
| Sample 5 | 6.42% |
| Sample 7 | 7.08% |

For each of the oils, the percentage of short chain fatty acids (S) and medium chain fatty acids (M) in the sn-2 position was determined. It was further determined what percentage of those triglycerides also had long chain saturated fatty acids (L) in the sn-1 and/or sn-3 positions and long chain unsaturated fatty acids (U) in the sn-1 and/or sn-3 positions. Results are provided in Table 11 below.

TABLE 11

Percentage Triglycerides (TAG) with S or M in sn-2 Position

| Description | S or M in 2 position (%) | S or M in 2 position and L in 1 and/or 3 position (%) | S or M in 2 position and U in 1 and/or 3 position (%) |
|---|---|---|---|
| Corn Oil | 0 | 0 | 0 |
| Sample 1 | 43.5 | 19.0 | 24.5 |
| Sample 3 | 51.6 | 43.8 | 7.8 |
| Sample 5 | 47.5 | 28.5 | 19.0 |
| Sample 7 | 15.8 | 1.6 | 14.2 |

Figure 2:
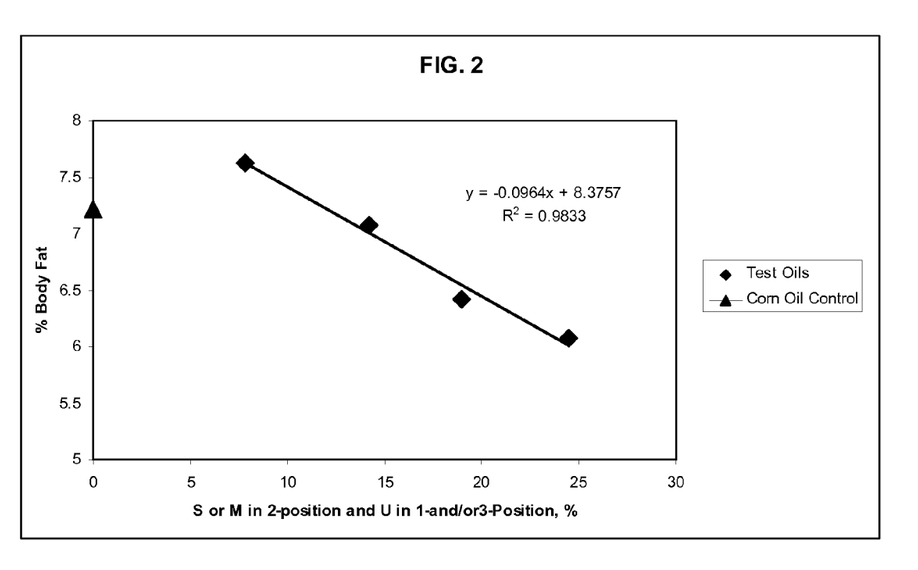
FIG. 2 is a plot of percent body fat and percentage of triglycerides in an exemplary mixture of Example 4 having short chain fatty acid residues in the 2-position and unsaturated long chain fatty acid residues in the 1- and/or 3-position.

As shown in FIG. 2, a plot of the percent body fat and percentage of triglycerides in the test oil mixture having an S or M in the 2 position and a U in the 1 or 3 position shows a clear, inverse linear relationship between the percent body fat and these glycerol esters. This relationship demonstrates that triacylglycerol composition containing unsaturated residues and medium chain or short chain acid residues in the 2 position are less efficiently converted to adipose tissue in a growing animal. Rather, the triacylgycerol composition is burned rather than stored.

The testing results validate a comprehensive structure-model for randomized fats. Using the above-described model, caloric content of any fat/oil can be predicted; structures can be selected that "burn" versus "store" fat; and new oils can be designed for best combination of yield, functionality, calories, and weight management.

It will be understood that various changes in the details, materials, and arrangements of parts and components which have been herein described and illustrated in order to explain the nature of the methods and compositions may be made by those skilled in the art within the principle and scope as expressed in the appended claims.

What is claimed is:

1. A lipid composition useful in formulating food products comprising a mixture of synthetic triglycerides having the formula:

wherein the middle group $R_2$ and the end groups $R_1$ and $R_3$ independently comprise fatty acid residues having 2 to 24 carbon atoms;

wherein at least about 14 weight percent of the triglycerides in the mixture are structured triglycerides having a first formulation wherein:

the middle group $R_2$ is a short chain fatty acid residue having 2 to 4 carbon atoms inclusive or a medium chain fatty acid residue having 6 to 12 carbon atoms inclusive, one of the end groups $R_1$ or $R_3$ is an unsaturated long chain fatty acid residues having 14 to 24 carbon atoms inclusive and at least one double bond therein, and the other of end groups $R_1$ or $R_3$ is a short chain fatty acid residue having 2 to 4 carbon atoms inclusive, a medium chain fatty acid residue having 6 to 12 carbon atoms inclusive, or a unsaturated long chain fatty acid residue having 14 to 24 carbon atoms inclusive and at least one C-C double bond therein;

wherein about 30 to about 80 weight percent of synthetic triglycerides in the mixture have a second formulation wherein:
- the $R_2$ group as a saturated long chain fatty acid residue having 14 to 24 carbon atoms inclusive;
- one of the $R_1$ and $R_3$ groups as a medium chain fatty acid residue having 6 to 12 carbon atoms inclusive; and
- the other of the $R_1$ and $R_3$ groups as a saturated long chain fatty acid residue having 14 to 24 carbon atoms inclusive, wherein the mixture of synthetic triglycerides has a molar ratio of short chain fatty acid residues (S), medium chain fatty acid residues (M), saturated long chain fatty acid residues having 14 to 24 carbon atoms inclusive and no C-C double bonds therein (L), and unsaturated long chain fatty acid residues (U), as defined by the equation:

$$\text{Molar Ratio} = (S+M)/(L+U)$$

of about 0.6 to about 3.8.

2. The lipid composition of claim 1, wherein the molar ratio is about 0.6 to about 2.4 and wherein the mixture of synthetic triglycerides, when digested within the gastrointestinal tract of a mammal, is absorbed and metabolized effective to shift more energy content thereof to energy expenditure and less to body fat storage than a similar amount of digested corn oil.

3. The lipid composition of claim 1, wherein the mixture of synthetic triglycerides includes at least about 14 weight percent triglycerides of the first formulation wherein:
- the $R_2$ group as a short chain fatty acid residue having 2 to 4 carbon atoms inclusive;
- one of the $R_1$ and $R_3$ groups as an unsaturated long chain fatty acid residue having 14 to 24 carbon atoms inclusive; and
- the other of the $R_1$ and $R_3$ groups as a short chain fatty acid residue having 2 to 4 carbon atoms inclusive.

4. The lipid composition of claim 3, wherein the mixture of synthetic triglycerides delivers about 7 to about 8 kcal/g of bioavailable energy.

5. The lipid composition of claim 1, wherein the mixture of synthetic triglycerides delivers about 4 to about 6 kcal/g of bioavailable energy.

6. The lipid composition of claim 1, wherein the mixture of synthetic triglycerides includes at least about 50 weight percent triglycerides of the first formulation wherein:
- the $R_2$ group is selected from the group consisting of a short chain fatty acid residue having 2 to 4 carbon atoms inclusive, a medium chain fatty acid residue having 6 to 12 carbon atoms inclusive, and mixtures thereof;
- one of the $R_1$ and $R_3$ groups is an unsaturated long chain fatty acid residue having 14 to 24 carbon atoms inclusive; and
- the other of the $R_1$ and $R_3$ groups is different from $R_2$ and selected from the group consisting of a short chain fatty acid residue having 2 to 4 carbon atoms inclusive and a medium chain fatty acid residue having 6 to 12 carbon atoms inclusive.

7. The lipid composition of claim 1, wherein the mixture of synthetic triglycerides is essentially free of trans fatty acids.

8. The lipid composition of claim 1, wherein the mixture of synthetic triglycerides comprises a substantially liquid oil at about 24° C.

9. A food product containing the lipid composition of claim 1.

10. The food product of claim 9, wherein the lipid composition is present in an amount effective to shift more energy content thereof to energy expenditure and less to body fat storage when the food product containing the lipid composition is absorbed and metabolized within the gastrointestinal tract of a mammal as compared to a food product having a similar amount of corn oil.

* * * * *